(12) United States Patent
Tabe

(10) Patent No.: US 7,769,342 B2
(45) Date of Patent: *Aug. 3, 2010

(54) MEGA-TELECOMMUNICATION AND INFORMATION SYSTEM

(76) Inventor: Joseph Akwo Tabe, 11700 Old Columbia Pike, Suite 717, Silver Spring, MD (US) 20904

( * ) Notice: Subject to any disclaimer, the term of this patent is extended or adjusted under 35 U.S.C. 154(b) by 852 days.

This patent is subject to a terminal disclaimer.

(21) Appl. No.: 11/475,286

(22) Filed: Jun. 28, 2006

(65) Prior Publication Data

US 2006/0240781 A1 Oct. 26, 2006

Related U.S. Application Data

(63) Continuation-in-part of application No. 10/814,087, filed on Mar. 31, 2004, now Pat. No. 7,116,941, which is a continuation-in-part of application No. 09/559,330, filed on Apr. 27, 2000, now Pat. No. 6,782,240.

(51) Int. Cl.
    *H04H 7/00* (2006.01)
(52) U.S. Cl. ............... 455/3.06; 455/66.1; 455/344; 455/345
(58) Field of Classification Search ............ 455/77, 455/345, 569, 556, 66.1, 569.1, 569.2, 575.1, 455/575.2, 90, 66, 557, 346, 501, 3.02, 550.1, 455/41.2, 41.3

See application file for complete search history.

(56) References Cited

U.S. PATENT DOCUMENTS

| | | | | | |
|---|---|---|---|---|---|
| 5,724,663 | A | * | 3/1998 | Lee | 455/557 |
| 6,058,298 | A | * | 5/2000 | Stamegna | 455/345 |
| 6,085,078 | A | * | 7/2000 | Stamegna | 455/345 |
| 6,226,497 | B1 | * | 5/2001 | Guntzer et al. | 455/66.1 |
| 7,349,722 | B2 | * | 3/2008 | Witkowski et al. | 455/569.2 |
| 7,395,096 | B2 | * | 7/2008 | Baratono et al. | 455/569.1 |
| 2002/0003571 | A1 | * | 1/2002 | Schofield et al. | 348/148 |
| 2002/0082058 | A1 | * | 6/2002 | Baratono et al. | 455/569 |
| 2003/0060219 | A1 | * | 3/2003 | Parsiokas | 455/501 |
| 2004/0196969 | A1 | * | 10/2004 | Palett et al. | 379/454 |
| 2008/0058024 | A1 | * | 3/2008 | Baratono et al. | 455/569.2 |

* cited by examiner

*Primary Examiner*—Tan Trinh

(57) ABSTRACT

A communication apparatus comprising a media device outputly configured to include various telecommunication and Internet applications. The communication apparatus being configured with an antenna apparatus communicatively connected to a chip in communication with the communication apparatus being responsive to a full access wireless communication connections. The communication apparatus being operatively configured with a communication control apparatus being operable for wireless device applications. Signal transmissions for the radio, the cell phone, and the Internet are separated and outputly communicated to the monitoring screen and the speakers for the media device to allow hands free-communication while driving.

52 Claims, 12 Drawing Sheets

A BLOCK DIAGRAM AND SYMBOL FOR A SILCON CONTROLLED RECTIFIER

A SIMPLE SCR SWITCHING CIRCUIT

MEGA-TELECOMMUNICATION AND INFORMATION SYSTEM

This Application is a Continuation-In-Part of application Ser. No. 10/814,087, filed on Mar. 31, 2004, now U.S. Pat. No. 7,116,941 which is a continuation in part of Ser. No. 09/559,330, filed Apr. 12, 2000, now U.S. Pat. No. 6,782,240, which claims priority benefit from provisional application Ser. No. 60/131,134.

TECHNICAL FIELD

Disclosed embodiment encompasses three modes of communications—the Cell phone, wireless Internet System, and Global communication and information, specifically configured for hands-free communication while driving. Certain disclosure of the embodiments provide an entertainment device configured to incorporate various telecommunications and Internet applications and communicatively connected to a sun-visor. The sun visor screen comprising a monitor screen being communicatively configured with an electronic screen protector for protecting the screen. The sun visor being further responsive to data communications, and includes viewing contents of communications. Further disclosure of the embodiments provides viewing contents of electronic data transmission without necessarily reducing/compacting the vehicle's interior space.

BACKGROUND OF THE INVENTION

Until recently, Cell phone usage has become increasingly useful to businesses, individuals and most of all, automobile users. Today, more people use cell phones for business transactions and/or to reach love ones. Yet cell phone usage has been blamed for about 70% of fatal accidents occurring on our roads. Presently, some cell phone companies have taken their technological savvy a step further by incorporating additional functions to their products, most of which have given drivers the lee way plurality applications, including Internet surfing from their cell phones. Of course, these recent technological advances in cell phones have resulted in many accidental deaths. For these reasons, many states have instituted and are enforcing a no-cell-phone usage while driving in order to save lives.

Meanwhile, automobile manufacturers keep adding more devices to their vehicles that could further discourage good driving behaviors when enabled. The said devices are additions and are configured to reduce the interior space of the vehicle; thereby creating an unsafe environment for its occupants. Also, efforts have been made to improve driving concentration—even while using cell phones. Yet, these efforts have made things worse for drivers in that, they have rather contributed in reducing the total available space in the vehicle, thus making it unsafe for its occupants. The rationale behind the present embodiments therefore is to provide a comprehensive solution to some of the shortcomings inherent in the existing prior arts. Further disclosure of the preferred embodiments provides a technology that is developed to advance cell phone and Internet usage in vehicles. Certain embodiments of the disclosure further comprise hands free communications while driving. These and other embodiments of the disclosure comprise a device operatively configured for enabling advanced entertainment and communications without occupying any interior space of the vehicle. Further disclosure of the embodiments means for enabling a communication environment for a safer cell phone and Internet usage.

Creation is the assembling and recording of ideas that, when properly implemented, help improve our society and our way of life. These ideas, when put to useful forms, are then arranged to fit our purpose. Purpose is our ability to use those ideas in an appropriate manner to solve some of the problems in and around our community, and society. Current devices have limited the growth of our way of life. In some embodiments of the disclosure, first a problem is being identified and analyzed. In other embodiments, the problem is being solved, and/or coded to address each problem variation. These codes could be text, signals, and symbols used to transmit messages around our work places, communities, businesses, and traffic. Certain embodiments of the disclosure include electrical impulses, sound waves, and light signals comprising at least a method of coding transportation and environmental information messages. The embodiments further provide at least a computer, telephone and radio operatively configured to rely on these impulses to receive and transmit signals. These signals are transportable messages to solve problems specific to our needs. The radio waves traveling through air or space are examples of electrical energy or impulses being used to advance telecommunication technologies. These impulses could be changed into sounds and and signals being used to transfer, emit, communicate, and absorb the coded information to and from different distant destinations.

The disclosed embodiments further provide a radio, which produces sound waves from these electrical signals. The suggesting code is a vehicular means of transmitting messages over crowded traffic and other locations without encouraging any accident and/or roaming. The source or sender information is first encoded and translated into the source message. The receiver information is then decoded for the information circuitry to be completed. These elements can eliminate the many problems that our drivers face daily on the highways and inter-city communication which, together, have been the root cause of many accidents, theft, car-jacking, and deaths.

Certain embodiments of the disclosure provide apparatus for environmental and transportation safeties. Present day driving principles and road safety technologies have outlived their usefulness. It's about time to part with the obsolete past and embrace modern technological advances that offer comprehensive solutions to the problems plaguing telecommunication technology in general, and safe driving in particular. The notion of people getting lost in inner cities and highways while driving, and while trying to get help by exiting the highway, or going to the phone to demand help when lost, is strongly discouraged. These habits have also contributed to car theft, car jacking, and many deaths. Also, available statistics reveal that cell phones or mobile phones have been the root cause of many fatal accidents in the United States. Yet, most drivers have no other options than turning to their cell phones to get help, when the need arises.

Unfortunately, majority of the victims of the current technological failures turn out to be women. Today, most women would easily shy away from the notion of driving on a particular road within a city/town and asking for directions. Studies reveal that when we drive and speak over the cell phone at the same time, especially with one hand grabbing the steering wheel and the other hand holding the cell phone hand set held close to the ear; our ability to concentrate and safely maneuver the steering wheel diminishes especially as the conversation becomes much more animated. This predisposes the driver to an accident because at the later stage his control over the car is greatly impaired due to the phone conversation. In all, cell phones have orchestrated many deaths on our highway.

That not withstanding, most people still prefer using cellular phones while driving for business communication purposes and to reach their loved ones at all times. Still, being in communications while driving can be improved effectively to further eliminate its current deficiencies. It is also true that in emergency cases, cellular phones have been more than helpful. Now, the question is: how much money are being spent on cellular/cell phone calls in and out of the cities? How can accidents caused by cellular phones be reduced? Or how can cellular phones be improved to cut down the rate of accidents? How can we get timely external help using the cellular phone? Is there any thing that can be done in order to improve on the cellular phone communications? People are spending lots of money on car phones with very limited airtime. This is because of the options available to them: and that is why newer technologies have to be developed to further improve on the airtime rate and better deal with the road safety. The disclosed embodiments further provide apparatus for communications and include information system being needed to enable advanced communications on our highway today.

Drivers and automobile users around the world would appreciate the luxury of driving and making phone calls simultaneously. Other aspects of the disclosed embodiments allow drivers to safely communicate using the cell phones while driving and having the car under full control with both hands on the steering wheel. Other embodied features of the disclosure includes global positioning system "GPS." This would further eliminate the need for drivers to step out of their cars to ask for help in the like of "how do I get to Holland Tunnel from here?", or "Which is the best way to get to 1600 Pennsylvania Ave?." Other aspects of the disclosure further include tag number dialing. That is, dialing the tag number of the vehicle closest to another vehicle would provide communications to further enable a platform for help. Implementing aspects of the disclosures would reduce the number of accidental deaths and casualties on our high way.

Disclosed embodiments further provide technological innovation embodied in mega telecommunications and information systems "Megatel." The megatel is further provided so that drivers would greatly contribute in reducing road accidents nation-wide. To conclude, cellular phones are good when used by pedestrians or passengers aboard a vehicle or automobile. They are also good for emergency rescue purposes, such as when a car breaks down and the driver has to call for assistance. However, all these are being incorporated into one safe device for enabling safe driving and better communication environment. Although some companies may be working tirelessly in an effort to improve on current telecommunication technology standards, especially on cellular or car phones while driving, the main focus should rather be on how to improve wireless communication, data transmission, reduce costs per call such as roaming fees, and also the number of accidents occurring on the road. Further embodiments of the MEGATEL system comprises configurations so drivers could safely use their cell phones for communications while maintaining control over the steering wheel.

With the disclosure of the advanced technology "MEGATEL" data are transmitted, downloaded, and electronically mailed, eliminating the need to pick up the phone to receive or make a call or to request data content. Certain embodiments of the disclosure provides at least a logic mode, which is turned on/off, all a driver needs to do is push the accept button to establish communication with the sender. In some embodiments, dialing a number comprises pushing and releasing the send button, which establishes communication with a correspondent. In case of emergency, dialing the tag number of closest vehicle would initiate communications for some help. The disclosed embodiments further provide dialing the tag number plus a family code to initiate communications to a loved one on the highway. The application of the later disclosure may result in immediate emergency response.

Friends and Families would thus be able to establish contacts and communications with their loved ones by simply dialing from a home phone to find out if the love one is safe out there. Further disclosure of the embodiments provide a directional software being configured for city streets networks or 411 network services. Certain disclosure of the network services include occurrences where one gets lost in a city uses the 411 button to automatically enable communications with the information network for that city, which turn would assist the driver with directions.

The disclosed embodiments further provide embedded random-access memory (RAM) operatively configured with (CMOS) and communicatively configured with the stereo comprising microprocessor intelligence to diligently resolve cellular phone problems. The disclosed embodiments further include a self-test chip device embedded with the stereo and being operatively connected to a cellular phone control board to constantly monitor the performance of the stereo, the cell phone, and the bypass mode: and to further insure routine checking of all other communication devices. The bypass mode further allows the full operations of the cell phone when detached from the entertainment device, including all operational features of the disclosed embodiments. The transmitters are designed to transmit to all destinations with the aid of the select mode button being configured to select different options. At least a mode is responsive to incoming signal and being configured to disable all the active functions of the stereo system temporarily to allow the receiver to receive incoming cell phone codes and other non-stereo signals. Until all the signals are transmitted, the stereo will stay disabled. At the end of the cellular/cell phone signal transmission, the stereo will return to the preset mode automatically and enable the continuous entertainment mode.

Disclosed embodiments provide improved technologies to the people, the community, and our society. Certain embodiments further provide information technologies to assist communication clarity and control of larger industrial and commercial companies. The embodiments further provide features that can surpass the two-way radios. Two-way radios are used by companies for communicating to fellow employees, to know how their businesses are running and to assign special duties to other employees, without having to come back to the base. With these technologies, for the most part, messages can only be sent or received. No two people can talk at the same time with the two-way radio device except telephone. However, most companies still have to provide for extra phones beside the two-way radios. In addition to the two-way radios the drivers in any vehicle still have to pick up the microphone to talk. This of course will have some degree of interference with their control of the steering wheel. Drivers still have to hold the microphone with the two-way phone which causes interference with the ability to safely control their vehicle.

Two-way radios can only go past a certain zone. Sometimes, where there are high-rise buildings, the two-way radios will not transmit signals. This type of communication system has been around for a long time, with the same unimproved technologies. Companies are constantly spending money trying to get their businesses going without knowledge of the safety aspect of the advanced technology. Disclosed embodiments provide improved technologies to facilitate means of communications and to give customers a better service with very limited time lost, while satisfying the company's goals.

Improvement comes with the acceptance of new ideas. It is imperative that out-dated technologies be replaced by new ones: those that would simplify the driving and communication process and also make the world a better place. With this new technology in MEGATEL, when one buys a car and goes to MVA or DMV for a tag, both the tag and MEGATEL tag card are issued. Next, he uses the tag card together with the incorporated state-of-the-art MEGATEL COMMUNICATION and stereo system transmitter and receiver to log onto all MVA-DMV in the country. The other disclosed aspect of megatel communication system for entertainment can also be installed directly from the factory as an accessory to the vehicle.

The stereo devices on older cars could easily be replaced with the megatel communication to meet the current technologies to further prevent accidents and casualties. Embodiments further provide a microprocessor operable to register the tag number of a vehicle as the acceptance number. When that tag number is dialed from home or from another vehicle equipped with the said MEGATEL device, the microprocessor will power the device to pick up the radio or microwave signal and communication is established. In accordance, companies would be able to reach any of their drivers or employees at any time, to pass on further assigned duties that need to be performed without distracting the driver's attention. The megatel communication system is a unique system by which cars, trucks, heavy trucks, and planes can curtail communication barriers.

The log-on process is to enable other drivers to dial the tag number of the other cars and access a phone line or cellular line communications without obstructing traffic. That is, when the driver gets lost in the city or in the highway, he will be able to ask for help without obstructing traffic, by dialing the tag number of the car closest to his. Disclosed embodiments provide apparatus for recognizing incoming and outgoing communication signals. If a household has more than one car and is interested in knowing the where about of any of the cars, they only need to do is dial the family code and tag number of one of the other family cars and help will be on their way. The driver of the said car, upon pushing and releasing the accept button, will accept the call and be able to communicate to the family member. A special code can be programmed to hit all the receivers of the family cars with one transmission. Certain embodiments provide apparatus to initiate a family line conversation so all members could be heard, to ensure the safety of the family members. With this technology, the careless parking in big city streets or the obstructions of traffic by other drivers in these cities will be eliminated, thereby assuring safety and reducing accidents and casualties.

The cellular phone is like the regular cellular phone with an information link being configured with the stereo to recharge the phone and also permit communications via the cellular phone to the stereo device to be broadcast through the car speakers. The cellular phone, when hooked to the stereo slot for charging, is a phone system with two metal bases at its ends that ensure the transformation from hand-held phone to the hands-free phone device for safe driving and communication. When pulled out of the slot, it becomes a hand-held cellular phone for normal pedestrian information and communication usage. When linked, the device ensures 100% safe driving in the cities or on highways while communicating to others.

Secondly, with this device, if a police is in a high speed chase he will be able to alert all other cars towards the direction of the chase to stay off the said lane by the mere push of a single button. This will help reduce traffic panicking and road-chase accidents on major highways in and/or around the country and ultimately save many lives. Some embodiments provide methods for advancing technology for the super high way communications and reduce the estimated cost to the society. In addition to this-state-of-the-art technology, every call made using the MEGATEL device will be locally billed. For example, if one is driving from one state to another and decides to make an out-of-state phone call the call will connect local receivers and transmitters within the sender's state and be billed as local call.

Furthermore, the MEGATEL device offers cell phone users a large array of benefits and options. Cell phones are, presently, very limited in their use. A cell phone beyond its local network becomes a very expensive device, but with the MEGATEL, each call made in a city where megatel is present, to any one in that city will be local. This does not eliminate the long distance links when dialing another location. For example, say a driver leaves Maryland to New Jersey. Every call that the driver makes to a family member in Delaware while in Delaware will be local. When the driver gets to Delaware, the MEGATEL device will switch to Delaware station through radio waves and microwaves transmissions. If the driver gets to New Jersey, the MEGATEL device will pick New Jersey frequencies and any call made there will then be local. However, even if the driver decides to call the original home from New Jersey, there would not be any variances.

With the MEGATEL device, phone companies will eliminate some of the car phone numbers or cellular phone numbers being used currently, by implementing the tag number plus ID-code dialing. The beauty of the MEGATEL system lays in its different areas of communication system possibilities. For instance, a driver is driving down town or on a highway in the middle of the night and realizes that there is another car following his—the MEGATEL device thus allows the driver to push a 911 button and transmit the danger signal to the nearest police station. It thus establishes communication between the driver and the police station without interfering with the driver's ability to safely maneuver the steering wheel. The car chasing the driver will be unaware of the driver's communication with the police. The driver will discretely give the police a complete description of the car chasing him without noticeable body language. If the driver knows the tag number of the car chasing him, then a 911 button plus the tag number will give the police a clear description of the person or car chasing him. With this advanced technology in place, the crime rate will drop and the cost to the society for repairing the aftermath will drop by $200 billion.

School principals, teachers, and parents will be able to use the school bus numbers, school bus tags, or a combination of both numbers to keep track of their students. They will also be able to use the MEGATEL device to verify if all the children on the bus reached home safely without interference with the driver's control of operating the bus. The MEGATEL device is a device that will help reduce communication problems and crimes around our cities. Calls will be transmitted from stations to stations, cars to cars, and megatel to megatel through the facilities of companies whose chief business operations are through telephone or Internet. Any subscriber will be able to reach any other subscriber from another company and the subscriber's provider will mail all the bills. For instance, when a driver uses this MEGATEL device to dial, for each dialing location, if the number is a local number for that location, and the driver is within that location, the MEGATEL device will select the nearest phone company station. The microprocessors and the fiber optics used to computerize the communication processes allow more features to beautify the MEGATEL system advancement.

The computerized station detector will search the nearest station and have the station to transmit all the coding signals to the various destinations. The station will then dial the number as a local number, provided that the sender and the receiver are within the local zone. If the receiver is out of the local zone were the sender is calling from, then the call could become a distance call and would be treated differently. With the tag calling system, the MEGATEL device will be able to search among huge array of existing MVA-DMA stations, picking the dialing tag numbers for any car and dial the car directly. If the car is tempered with, the computerized MEGATEL device will explain this to the sender and the sender will immediately know that there is trouble somewhere. The computerized station detector will prepare all itemized bills through the megatel Internet services with telephone companies and send to the subscribers of each MEGATEL user. The tag card will carry programmed information on how the MEGATEL device and the computerized phone station detectors should work. The tag card, the MEGATEL device, and the computerized station detector are elaborating systems that are made up of various kinds of transmission media sensors that allow interactions between the devices. These systems would pick the stations and assign the stations to carry voice and data signals from place to place, and switching the systems that connect the circuits that link together two parties.

Disclosed embodiments further provide interactive signal detection and switching medium with voice enabled applications. Only high technology combined with the economics of scale in research, design, manufacture, and operation can keep the cost of telephone down as services expand. So the MEGATEL system is designed to aid this technological branch to reduce cost and increase safety. The microprocessor is designed and programmed to identify numbers and to speak to other microprocessors. These microprocessors serve as the main information exchange center by absorbing and emitting radiant energies through waves and can demodulate the absorbed energy or modulate the emitted energy. The energy signals are modulated or demodulated from the coded information. The MEGATEL microprocessors allow other networks and businesses to advertise by programming plurality of microprocessors, said processors being interactive, to emit the advertisement codes. Another important feature of the megatel device is that, the tag code can be changed if the tag number is changed.

Disclosed embodiments provide means for feeding external data into radiant energy data channel. Certain embodiments further provide means for modulating the radiant energy emitted by radiant energy sources, according to the output codes assigned to each of the microprocessors. Other embodiments provide the codes being demodulated to demodulate the absorbed radiant energy. Some embodiments provide the microprocessor being configured to absorb the radiant energy signals when calls are transmitted and also exchange coded information or signals: enabling the powered antenna motor to serve as a wave-guide power supply that receives and transmits signals from the microprocessors. Disclosed embodiments provide an antenna apparatus being operable to absorb and also to emit signals from other microprocessors. Certain embodiments provide microprocessors are communicatively programmed to accept tag numbers, phone numbers, industrial equipment numbers, and commercial vehicle numbers, and to communicate with ambulances, fire trucks, police, other emergency vehicles, construction areas and equipment.

This MEGATEL system is a stereo system with a built-in cell site for cellular or wireless phone transmission. The device uses fiber optics to transmit and receive wave signals from radio waves and microwaves, and also to determine the amount of light traveling down the fiber. The device also uses fiber optics to measure the amount of light coupling from one fiber to another in optical radiation. The fiber optic receivers for this device are high-performance and easy to use linear fiber optic module that are designed to extend the range of radioactive frequency (RF) signals in hard-to-reach areas such as tall buildings, underground railroads, submarines, and tunnels. Some embodiments of the disclosure provide a fiber optic modem chip operable, at full or half duplex over fiber optic cables or waves to allow faster communication signal transmissions.

Disclosed embodiments provide apparatus to promote safety while simplifying its usage. Certain embodiments provide a hold in slot for the cellular phone. The cellular phone has a coded metal base end that, when inserted into the hold in slot, will recharge the phone and also permit cellular communication through the stereo MEGATEL microphone and the stereo speakers of at least a vehicle. When the vehicle is packed, the cellular phone is pulled out of the slot and used like a regular cellular or wireless communication device for non-driving purposes. In other words, the MEGATEL device is used as a hands-off communication device for drivers like a regular cellular phone if taken out of the slot. The microphone is used to talk party-to-party without actually holding it. This will allow the driver to have total control of the steering wheel with both hands while talking on the phone.

In other embodiments of the disclosure, the microphone could be mounted on the ceiling of a vehicle for a headset, or embedded in the sun visor, the steering wheel, or the dashboard. The headset or speakers are powered by the MEGATEL built-in amplifier and is connected through modular connectors. The main stereo volume control also controls the phone volume. Disclosed embodiments further provide apparatus for taking messages for later transmission and include Internet ready transmission. Some embodiments of the disclosure further provide at least a screen covered with electronic control protective shield that is opened when the Internet or communication service is enabled. The Internet service is disabled when the vehicle's speed exceeds the preset limit, thereby allowing the Internet service to depend on the speed of the vehicle, to further prevent future accident caused by the driver's lack of focus.

Certain embodiments provide a communication apparatus operable on different frequencies including giga range frequencies for better communication clarity. The signals are separated into more frequencies to make conversation interference very impossible. The headset is attached to the cellular phone to be powered by the amplifier configured to directly receive(s) all incoming calls. The phone could also be inserted into the slot so that megatel will receive all transmissions and codes through the metal base being provided to power all signals through the microphone and the antenna. Disclosed embodiments provide microprocessors designed to continually monitor all communication devices and automatically transmitting and receiving different coding signals to and from different destinations. The megatel is a stereophone with Internet ready access mode, powered by the stereo amplifier and further include screen viewed from the sun-visor that has a protective cover shield to further prolong the life of the screen. Other embodiments provide communication devices operatively configured with microprocessor chips operable to transmit and receive different signals through radio waves and microwaves frequencies.

Disclosed embodiments further provide communications and entertainment station being configured with apparatus for processing millions of instructions per second. Certain embodiments provide a communication-processing module comprising a microprocessor being configured for signal communications and information handling, and allows other communication devices to communicate with the megatel through the stereo speakers and microphones. The microphone could also be of many designs including a cordless headset mounted in the vehicle, at the roof so that it could easily be removed and be used by the driver for privacy usage if there is a third party in the vehicle. The cordless microphone is designed to improve on noise cancellation and to transmit communication signals with better clarity. Handling a cellular phone with one hand and driving at the same time can create hard flexion on the shoulder, headache, and neck pain, which can in turn influence an accident. On the contrary, driving and talking through the headset is very relaxing and will help reduce the many accidents that occur on our roads and highways. With the megatel, careless accidents caused by the communication devices currently in use, will be reduced. Just a second of poor posture while driving can lead to a serious accident. Therefore, it is the object of the disclosed embodiments to introduce the MEGATEL device, a hands-off telecommunication device designed communications and to ease traffic communication and also reduce the number of accidents caused by prior art cellular phone device.

Certain embodiments provide a built in amplifier that also amplifies the microphone or cordless microphone. The cordless microphone is adjustable to accommodate different drivers. Some disclosed embodiments further provide a mode button that has many features including deactivating incoming calls if the driver does not want to be bordered. Disclosed embodiments provide the mode button which could be switched from phone mode to stereo mode, to listen to music through the headset. When there is an incoming call the mode will automatically switch back to phone. Certain embodiments further provide an interface unit operable through a circuit board operatively configured for control functions in communications with the memories to control functions of the microprocessor through the network software. Some disclosed embodiments provide a fiber optic modem chip operable through at least a manual or an automatic switch, or through the corresponding pin interface being operable to activate the fiber optic modem. The switching may further be achieved through the transmitting time of the following sources: an internal oscillation, an external clock from the MEGATEL device, a loop-back clock derived from the receive signal.

Disclosed embodiments further provide a transmission modem that is synchronous. This means, the transmission time is selected for internal, external, or loop-back clock. Transmission signals are converted internally to synchronize the format in compliance with other standards. All other formats are switch selected. Disclosed embodiments further provide a modem chip, which could be a card or any other design, to better suit the purpose of transmitting and receiving signals to and from automobiles and other transportation equipment or industries. With this device or with the incorporation of a pressure sensor on the seat surfaces of airplane seats, electronically knowing how many passengers are seated and also communicating to individual passengers in the plane will be much easier. Certain embodiments provide a linear fiber optic transmission links operatively configured for satellite earth stations to communicate signals at the same frequencies as the links. With this linear fiber optics, distance limitations between antennas for the MEGATEL device or other broadcasting media operation centers will virtually be eliminated. The linear fiber optic earth satellite station and the delivering signals communicable without any automatic gain control. To meet the global telecommunication demands today, and also improve on the safe usage of phones by drivers, the linear fiber optic transmission system will satisfy the design of all the state of the art telecommunication devices of the MEGATEL system.

Disclosed embodiments provide apparatus that allow communication between many personal computer systems, space communications, communication between movie producers and actors, without physically holding the phone system to talk. Certain embodiments further provide apparatus operable on a push a button and release to talk while driving or while performing other duties in the work area. Communication between actors and producers will be easily transmitted, received and controlled by a single device with the disclosed embodiments. Just push the receive button to receive incoming calls and talk while driving. All signals are digital and analogs via radio and microwave frequency communication signals through the fiber optic cables.

Often, automobile drivers like to communicate or talk on the phone while driving. The unsafe technicality of this behavior is, some drivers hold the phone on one hand while controlling the steering wheel with the other. Sometimes, drivers get carried away by the conversation and lose control of the vehicle. Other times, drivers block traffic because they are trying to make phone calls or ask for directions. Disclosed embodiments provide apparatus to advance communications and abolish these behaviors. Therefore, communications by drivers and other automotive communication devices have to be advanced to meet the demands of modern day technology so drivers will be able to communicate without impairing their ability to control their vehicle. Also, when people get lost while driving around, they would not have to come out of their cars to ask for help. Certain embodiments provide apparatus operable to communicate to any driver while both cars are in motion. Some disclosed embodiments provide apparatus operatively configured to improve daily live communications and entertainments. The process of exchanging information from vehicles to vehicles, or from homes, offices, businesses to vehicles is called communication and human senses depend on more advanced technologies to make this simpler.

Disclosed embodiments further provide a media device being configured with interactive screen input/output and/or for communications. Information is the knowledge that is conveyed between the parties involved. For this information to reach the other party, it has to be transmitted or pass along so that the party can receive it. Sights are another way of communicating. That is, what one sees gives great meaning to what he sees and hears. The exchange of messages and the accidents that have resulted in between, as one party tries to convey a message to the other party, is what is leading to the advancement of this MEGATEL system. During the communication process or drills, the parties usually get carried away and lose control of the vehicle. In many cases, these have resulted in accidents where the causes of the accidents were not found.

Because the accidents were communicated to a third party through sights, calls for the advancement of a better automotive communication system that will not take the driver's hands away from the steering wheel, but rather improve on the means of communication.

It is therefore the object of the third party to communicate these findings into technologies that could eliminate these types of accidents and also prevent many injuries and deaths. The key to solving these technical problems includes the technical processes of exchanging information. This information is in the form of communicating, and communication technology is the process of transmitting information from a source to a destination, using codes and storage signals. Machine to machine, machine to human, and human to machine communication are the most common forms of communication being embodied in the disclosure, including hands free communications. The human to machine communication will allow the driver to transmit information to the other vehicle with an extended capability. The machine to human communication system will allow the driver of any of the other vehicle know that some one is trying to reach to the driver or the occupants. Certain embodiments further provide apparatus being operable for communication interface.

Disclosed embodiments further provide an improved automotive communication system that reduce accidental injuries caused by lack of concentration on the steering wheel. Certain embodiments provide a microchip or microprocessor operable to turn receivers on and off when a call is made. Some embodiment of the disclosure provide a communication system that receives and transmits signals from one vehicle to the other. The microprocessor further operable to increase transmittal speed responsive to 911 codes when a collision is detected. Disclosed embodiments further provide a communication apparatus functionally programmed for communications without interfering with the steering wheel control. Certain embodiments provide automatic switchboards, radio waves and microwave transmitters, satellite, and optic fibers operable for transmitting/receiving phone signals around traffic and the world. Other embodiments provide communication apparatus operable for transmitting Information from a source to a destination through codes and signals. The transfer of information include designing, coding, transmitting, receiving, and storing of data in a system.

Some embodiments of the disclosure provide the source and the starting point of a message to be sent. This source might be a machine, a person, or a supplemental system. The designing process for the disclosed communication system includes ideation, purpose, and creation. In ideation, one would get and work on ideas that will increase driver's concentrations, reduce the number of accidents caused by lack of steering wheel concentration, and improve our way of life. Disclosed embodiments further provide apparatus that implement actions to increase traffic communication and reduce traffic accidents caused by the previous automotive phone system. Some embodiments provide a messaging system that informs, persuades, instructs and entertains drivers and other businesses around the world. The information system operable with a receiver to inform and provide the transmitted message. The general message that instructs all drivers also provide directions or knowledge about the future or upcoming events and road situations coded instruction in the highway boards and other road construction areas as the car approaches these locations. The message that persuades will help convince drivers and others to take caution on different situations and events around the cities and the highways.

Disclosed embodiments further provide advertisement messages communicable to alert the public and drivers alike of some sales and other upcoming events without distracting their attention. Certain embodiments provide billboards along major highways being equipped with programmed microprocessors communicatively configured to ensure smooth transmission of vital information including ad messages to on-coming cars from a distance approach to the billboard. All Exit and road signs shall be equipped with programmed microprocessors as well. These programmed microprocessors operable to allow communications with the MEGATEL device, including the approaching cars next exit on the highway. Disclosed embodiments further provide communication apparatus that communicate with all highway signs and advertisement boards. Certain embodiments provide compatible chip communicatively configured with the programmed processors. Other embodiments provide the microprocessors operable to communicate with other processors wirelessly. Disclosed embodiments further entertain by providing some form of amusement to users and drivers while driving. Certain embodiments provide a communication apparatus in wireless communication with car stereos, further responsive to phone and Internet device, when there is a message, a phone call, or e-mail, the stereo system will be bypassed and the phone system will automatically be activated. The stereo amplifier, through the stereo speakers, is configured to amplify the receiving and transmitting messages. Certain embodiments provide a microphone located on the steering wheel, sun-visor edges, ceiling, or dashboard operable to absorb and transmit the messages.

Disclosed embodiments provide a sun-visor being operable with electronic screen for receiving electronic and Internet messages. The sun-visor has automatic or foldable cover for the screen. Certain embodiments provide the screen operable to output electronic messaging and Internet communications. The sound waves produced by the radio would transmit or receive coded signals for transmission to any destination. Disclosed embodiments further provide further provide a media device. These radio signals traveling through the atmosphere would carry the coded messages to the media device. Certain embodiments provide a communication device being configured for radio programs, cellular transmissions, and TV broadcasting to assigned locations. Telephone conversation travels through wires and fiber optic cables. Receiving and transmitting this communication is the process of acquiring and decoding the message. Disclosed embodiment provide a receiver being operable to decode or interpret messages from any of the sources.

Certain embodiments provide cellular and/or stereo receivers operable to convert the radio waves into pleasant sounds that one can hear and understand. Messages could also be stored for later use. But after the storage, the process of communication will not be complete until a feedback is received. Successful communication is often the result of feedback provided to the sender. This feedback is usually a returned information to the sender to confirm that the message was received. The feedback is a communication process that responds to the completed communication signal and coded signs. Another point of concern that is affecting current hand-held cell phones is the interference. Interference is the distortion of signals intended to the receiver. This interference is caused by the reception of undesired signals. The interference can be the called noise or distractions that interfere with the communication process. Disclosed embodiments further provide an accurate communication device operable with amplified means. Other embodiments further provide the media device operable with a rechargeable means. Accurate communication is the freedom from mistakes or errors when a message is sent to a receiver. However, manufacturers realizing this interference would make the accuracy possible through the receiver/transmitter chip. The receiver chip would be able to instantaneously pick the signals without any interference.

When sending a message to someone, the receiver should not receive any other message than what was communicated. Careful and designed planning may prevent inaccurate transmissions of information. Disclosed embodiments further provide a chip operable on a circuit being configured with the antenna for signal transmission accuracy and destination free. The key to this advanced communication device is to allow friendly and safe conversation around the high way and inner city by increasing the level of communication signal clarity. The communicated information is being exchanged among people, machines, police, governments, businesses, schools, and industrial groups without interfering with the environmental safety. In part, telecommunication is the transmitting of information or signals between distant points where the information would be received, understood, and used. All major industries would include varieties of systems for the exchanging of messages. The most common example is the telephone. The use of satellite to transmit radio signals around the globe is an excellent example of telecommunication system being utilized with the disclosed embodiments for solving the current communication problems. Certain embodiments provide a communication apparatus being operable with a telecommunication satellite to receive many radio transmissions and programs.

Disclosed embodiments provide a communication apparatus for communications, information messages, electronic signaling and transmission. For example, a police chasing a car in the highway would be able to transmit certain verbal information at say x-miles away, through the use of the coding means, to reach all vehicles on the chasing lane. The chasing lane and the direction of the chase is being instantly communicated to all the vehicles heading the way of the action in view of forestalling the occurrence of potential accidents. In all, the advanced information technology system operable with human-to-human, human to machine, machine to human, and machine-to-machine communication signals. Disclosed embodiments further provide quick means of exchange of information over long and short distances at low cost Disclosed embodiments further transmit and receive information in electronic form. Major construction companies will be able to provide the following messages to approaching traffic miles away: "Road construction ahead, Road block, Traffic jam, Major accidents, Advertisement." A constant flow of more messages could he followed. Our life relies heavily on communication system. From the beginning to the end of the day, we use communication devices to reach out to others, or relay our thoughts to others. Disclosed embodiments provide a communication apparatus being further operable for communications with large groups of people or individuals, as well as advertisement, traffic instructions, entertainment, persuasion and information. When calls are made, the calls will be sent through series of transistorized switches until the calls are connected with the other telephones at the addressed identified. Certain embodiments provide a communication apparatus that enhances the convenience of communicating quickly and easily, over any distance, without interfering with the driver's ability to safely maneuver the steering wheel. The communication process comprises of designing, coding, transmitting, receiving, and storing of information or messages. Some embodiments of the disclosure provide an interactive device for communications and safe driving. Other embodiments of the disclosure provide a wireless communication apparatus communicatively configured for networking and the Internet communications. The designing process for the disclosed embodiments are uncompelled and unlimited.

Devices that could have helped our way of life and improve on cellular and automotive communication processes without interfering with our driving abilities are lacking. The acts of selecting what is good for our environment and the society's safety, and revising these acts to invasion the past problems would provide a better technology for the advancement of the life of the people around the world. When the message is received, it is decoded so that the receiver may better understand it. After the message is decoded and understood, it may then be necessary to store the information in any other machine, either at home, office, car, or fax for use at a later time.

When a message is sent, a feedback is returned to inform the sender about the status of the message. Disclosed embodiments further provide an automotive communication system that entails more options like: informing, instructing, persuading, entertaining, and advertising. Often, we rely on our senses to communicate with others. Because of some defects in previous devices we have to rely on both our senses and technologies to communicate with others. The technology is attached to our senses to extend our ability to understand others without obstructing traffic or creating an unsafe environment for others.

The same antenna designed to control the stereo are all built-in and operable with the internal logic board, and also to provide excellent reduction of the pressure effects of the stereo and the current phone system. Together, the stereo and the phone are called MEGATEL SYSTEM. The reduction of the pressure effect will improve the transmission and receiving of the transmitted information. This antenna is made up of cell foams and would allow the stereo and the cell phone to operate on the same mast mounted antenna. The antenna is operable to receive and transmit coded information; all functions and signals would then be emitted and absorbed on the same antenna. The single but dual functional antenna is communicatively configured with the chip for eliminating the acoustic interference problems that exist in the wave traffic. The quality features of the antenna include stainless steel ferrule, high-gloss urethane finish over fiberglass, powerful brass internal elements, ferrite choke bead, and UV stable RG-8x marine cable with a factory-installed mini-connector. The antenna is powered by a motor, and designed to reduce the whistling effects and also to damp the occurring wave due to vibration. Certain embodiments provide antenna apparatus communicatively connected with a chip being on a circuit. Other embodiments of the disclosure provide an antenna motor which is turned on when the ignition switch of a vehicle is turned on. When the ignition switch is turned on, the circuit for the antenna motor will be closed and the antenna motor will rotate on one direction, enabling the antenna to be raised up.

When the ignition switch is turned off, the circuit for the antenna motor will be opened and the antenna motor will rotate on the opposite direction for the antenna to be lowered. The antenna end cable is fed down into the motor housing opening and positioned correctly inside the housing so that the power antenna motor would start pulling the rest of the power antenna cable till the collapsed mast sections down into the motor housing. The cable and the mast are carefully guided into the motor housing. Disclosed embodiments provide apparatus being operable to transmit a shaped wave for the stereo and the cell phone. Certain embodiments provide an antenna apparatus being operable with a collapsing spring at the base of the motor, with a straight extended vertical exposure. The antenna is inclined slightly to have much higher transmitting signal, since the cell site path is located in the horizontal pathway from the location. However, the optimization of the antenna allows for both vertical and horizontal transmission. The slight inclination of the antenna will increase the amount of power transmitted straight up into the sky. This will also reduce the static because cellular phone base transmitters are more powerful than the verticals, and signal reduction due to bent cellular antennas are more noticeable on the other end.

Disclosed embodiments provide antenna apparatus with a stronger link operable with wireless communication devices and/or with vehicle stereos to oversee any weak signal. The antenna could be from 4" to 24" with ultimate signal pulling power. All internal elements are sealed with fiberglass rod coated with high-gloss urethane finish. The high-gloss urethane coating is to ensure lasting performance and more compatibility with the other high quality antenna products that could be used. Certain embodiments of the disclosure provide an antenna apparatus operatively connected to a chip operable at other frequencies. Disclosed embodiments provide improvement to acoustical reduction and better communication performance and result, and operatively configured for transmitting, receiving, switching and transmitting, receiving and switching, receiving by combining ground to air to transmit and receive signals.

SUMMARY OF THE INVENTION

Disclosed embodiments provide improved communication apparatus comprising media device, computer device, cell phone device, and hands-free cell phone and Internet usage while driving with amplified signals from different frequencies. Certain embodiments of the disclosure provide a method of assigning new cell phone numbers, which include tag number for selected personal identification number.

Disclosed embodiments further provide a method that includes maximum allowable power levels, which are comparable to the task to which the radio is operable. Disclosed embodiments is further operable through radio and microwave frequencies, including electromagnetic waves. Disclosed embodiments further provide a method of the waves being used to guide the direction of all addressed information or codes. When a transmission from any frequency is sent out, the waves will hit a layer of the earth's atmosphere called ionosphere. The ionosphere will then reflect the waves back clown to the earth. These waves may reflect back and forth any number of times till the receiver is found. For better understanding of the wave's behavior, it should be compared to a ball that bounces in a room with a low ceiling. The ball will bounce off the floor and ceiling several times before it stops bouncing. The ball will most likely strike an object that is placed in the middle of the room. That is, a wave that is bounced off the ionosphere is very similar to the ball's behavior. Sooner or later, the signal will contact the receiver. Disclosed embodiments provide chip being operable with an antenna apparatus in communication with the signals traveling through the waves. The chip is operatively configured for signal amplification.

The wave reflections off the ionosphere will make transmissions over great distances possible through the incorporation of the chip being operable with the antenna apparatus for wireless communications including the Internet and networking. The MEGATEL transmit and receives signals through radio waves and microwaves. But microwaves have several advantages because their wavelengths are so small. Some of the advantages of the microwaves are that signals can be projected into a very small area through amplification. Which means the energy is being used efficiently. Disclosed embodiments further provide embedded small antennas for microwave use. Some of the disadvantages of the microwave signal are the effect of poor weather on microwaves. That is, since the wavelengths are so small, rain, snow, hail, or even a high wind may absorb the energy in the signals. However, the amplified spring-like behavior on the powered antenna compensates for the wind and other foreign factors. The MEGATEL comprises a cellular phone, and uses radio waves to transmit information. Certain embodiments provide a device that uses both one way and two-way radio messaging methods to transmit information. That is, messages could be sent back and forth through the radio waves between a source and a destination. Certain embodiments of the disclosure provide feedback method being operable to respond directly to messages on two-way devices.

Two signals could be sent at a time with the disclosed MEGATEL device. That is, voices would be heard from both the sender and the receiver at the same time. In the other two-way radios, when a talk button is pushed in, the radio cannot receive a message, but could only send messages out. The major portion of the switching system for the megatel device is electromechanical. Some embodiments of the disclosure provide electronic pulse (number dialing) switching method for communication, including the network and the Internet communications. Certain embodiments of the disclosure provide a preferred electronic switching system (ESS), including computer programs being used to do routine wireless operations and switching operable through transistorized switches and microprocessors. All the switching programs are stored in the microprocessor and the processor operatively configured to differentiate a telephone signal from a stereo or radio signal and bypass the radio, so that the receiver could receive and transmit messages for wireless communications.

When sending messages, after the numbers are dialed, the computer will review the number codes and check for wireless phone or Internet assignment. Then the quickest switching route is mapped out through the use of the transistorized switches and the microprocessors to complete the call. Disclosed embodiments further provide a method of using the transistorized switches and the microprocessors to collect the coded electronic pulses from the dialed phone. The computer is operatively configured to review all the numbers and maps out the switching route to complete the call. This electronic wireless switching system is further operable to make communications more efficient than electromechanical switching system. It is also quicker, less costly, smaller, and more reliable and uses less power. Cellular phone numbers could be changed with the tag number plus a programmed code. Where as, the direct tag number dialing is to assist other drivers.

Disclosed embodiments provide the computer device being operable with a software program to identify codes, complete all calls, and control the overall function of the communication apparatus. Disclosed embodiments is operable via a network, which is a system of interconnected subsystems. Certain embodiments of the disclosure provide a communication apparatus which is communicatively connected to car phones, homes, offices, businesses, and further provide industrial connections to allow worldwide connections and also provide a common link to the computers and the Internet. Certain disclosed embodiments provide a communication apparatus which permit networking and wireless Internet connections being operable through transmission links, terminals switching operations that work together for the Internet services. Disclosed embodiments further provide apparatus that necessitates calls completion and also sends worldwide information via vehicular media transmission through the Internet. The transmission links transmit calls, the network switching system complete the circuits, and the MEGATEL system allows the sender and the receiver to hear and be heard. The MEGATEL device has a modem configured to enable Internet services and other searches.

The modem allows the megatel device and its computer system to communicate with other devices and their computer systems, over the microwave to radio wave links through wireless communications and provide better wireless Internet services and satellite communications. The communication satellite will receive and send signals to all coded destinations. These signals must travel a great distance to the satellite (up link) and back to the earth (down link) again to enable transmission. The microwave beams will transmit signals and be used for transmissions of signals from source to destination. Microwaves are able to cut through the earth's atmosphere easily. Therefore, the beams must be carefully aimed towards the proper ground station or satellite. The signals are sent and received using special antennas. However, the ground antenna and the satellite must be able to stay in constant communication contact in order to transmit these signals. The satellite must also circle the earth at the same speed the earth revolves on its axis. If the satellite moves faster than the earth revolves, the contact could be broken.

The phone conversations will travel through microwave relay stations. Vast amount of information can be transmitted through microwaves links. This is because microwaves are extremely short. Therefore, microwaves can be concentrated (focused) into a very small, narrow beam. These beams will allow powerful, efficient transmissions around the globe. That is, a very large and powerful transmission would send thousands of telephone calls every second via signal amplification methods. All codes being operable in the disclosed embodiments are in binaries. These binaries are series of 0s and 1s that represent phone numbers and the tag numbers, letters, sound, or visual images. These binary numbers are in data form. Data communication is the process that allows computers to talk with each other. The codes, which are the vehicle for transmitting messages, are the language that the computers will use to communicate with one another. The coding will also ease communications between machines made by different manufacturers. This code is in a programmed form and could be executed by the microprocessor. The American Standard Code (ASC11) may be used for information exchange. This code includes all the letters of the English alphabet, the number 0 through 9, and punctuation. Disclosed embodiments provide communication apparatus that provide easy communication method to family members, companies, friends, businesses, relatives, industries and others around the globe. The method further provide ease of contact with their love ones, job and more, at any time, anywhere, and any state while driving. The transmission methods could be parallel transmissions for short distances or serial transmissions for long distances. In at least one disclosed embodiment, a hands-free communication is achieved. In another embodiment, wireless Internet activities are achieved. Other disclosed embodiments provide an IC card being used to store data specific to the communication means. The advantage of disclosed embodiment would become apparent to the understanding of wireless communications and safe driving.

DETAILED DESCRIPTION OF THE PREFERRED EMBODIMENT

Figure 1:
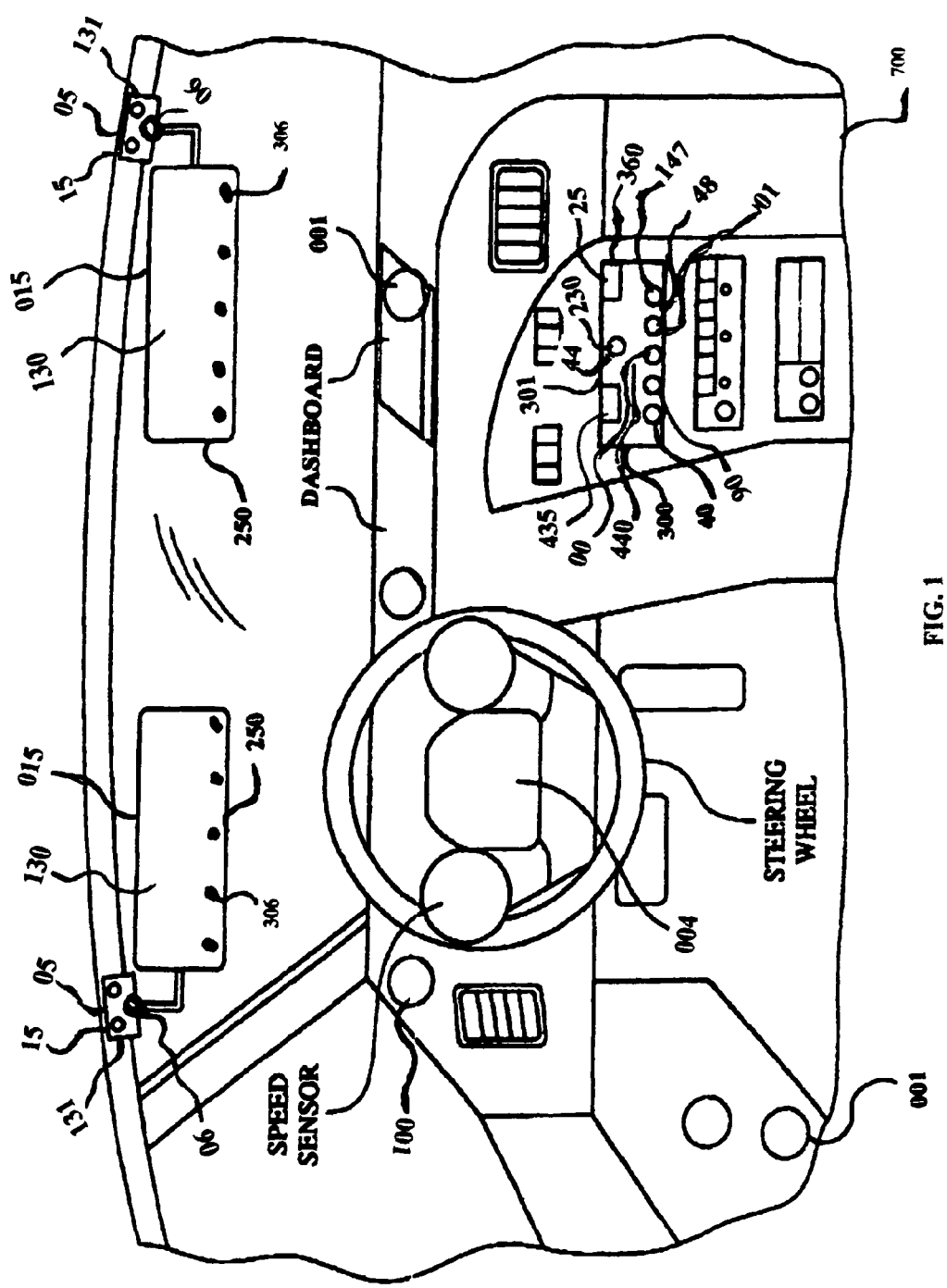
FIG. 1. is an exemplary embodiment of the megatel device, the monitor screen, the speaker means and the steering wheel, seen mounted in locations common to normal vehicle operations.

The terminology used herein is for the purpose of describing particular embodiments only and is not intended to be limiting of embodiments. As used herein, the singular forms "a", "an", "at least", "each", "one of", and "the" are intended to include the plural forms as well, unless the context clearly indicates otherwise.

It would be further understood that the terms "include", "includes" and/or "including", where used in this specification, specify the presence of stated features, integers, steps, operations, elements, and/or components, but do not preclude the presence or addition of one or more other features, integers, steps, operations, elements, components, and/or groups thereof. In describing example embodiments as illustrated in the drawings, specific terminology is employed for the sake of clarity. However, the disclosure of this patent specification is not intended to be limited to the specific terminology so selected and it is to be understood that each specific element includes all technical equivalents that operate and/or function in a similar manner. It would be further noted that some embodiments of the enclosed communication apparatus is used concomitantly and/or not used concomitantly with megatel. In some embodiments, the communication apparatus comprises a platform array responsive to media communications. In some embodiments, the communication apparatus further comprises of a platform array responsive to signal radiation. Other embodiments herein describe apparatus configured for entertainment.

The foregoing and/or other objects and advantages would appear from the description to follow. Reference is made to the accompanying drawing, which forms a part hereof, and in which is shown by way of illustration specific embodiments in which the embodiments may be practiced. These embodiments being described in sufficient detail to enable those skilled in the art to practice the teachings, and it is to be understood that other embodiments may be utilized and that further structural changes may be made without departing from the scope of the teachings. The detailed description is not to be taken in a limiting capacity, and the scope of the present embodiments is best defined by the appended claims. Referencing the drawings, wherein reference numerals designate identical or corresponding parts throughout the several views, exemplary embodiments of the present patent application are hereafter described. The numbers refer to elements of some embodiments of the disclosure throughout. As used herein, the terms "and/or" and "at least one of" include any and all combinations of one or more of the associated listed items.

Referring to FIG. 1 is seen an exemplary embodiments of a megatel communication system comprising entertainment means, a radio means, a cell phone means, a paging means, an Internet means, a sun-visor monitor screen means. Embodiment transmits and receives signals in relation to responding to a wireless communication through the megatel device (300), further comprises a hand's free device being operable for safer cell phone communication through a stereo and radio device. Embodiment further provides a vehicle (700) being disposed with a media device 300 comprising a body 301 comprising at least one of: a cassette player (435), a CD player (440), an input device (230), and a phone slot (25). The media device being operatively configured with a control device (40) comprising at least one of various mode buttons (90). Internet button (00), self-test button (44), a base sensor (360), a send button (48), an input/output terminal (01), and a signal booster (147). The signal booster (147) is operatively connected to antenna apparatus (100). Embodiment further provides a control device being operable on a sun-visor screen (130). The sun-visor screen (130) further comprises at least one of: a mirror case (15), a cover (015), a sun-visor base (131), a monitor (250) being interactively operable, a microphone (306), and a speaker (001). The sun-visor may be operable on a mounting base comprising at least a ball joint (06). The speakers (001) could also be disposed on a steering wheel (004).

Figure 2:
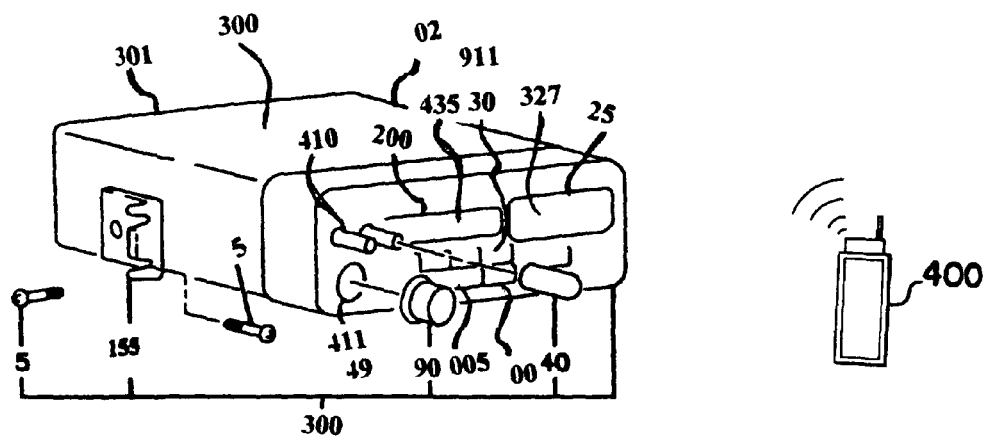
FIG. 2. is an exemplary embodiment of the interface unit for the media device and the cell phone device seen configured with the microprocessor, the megatel, the cell phone being configured with a metal base sensor.
Figure 2:
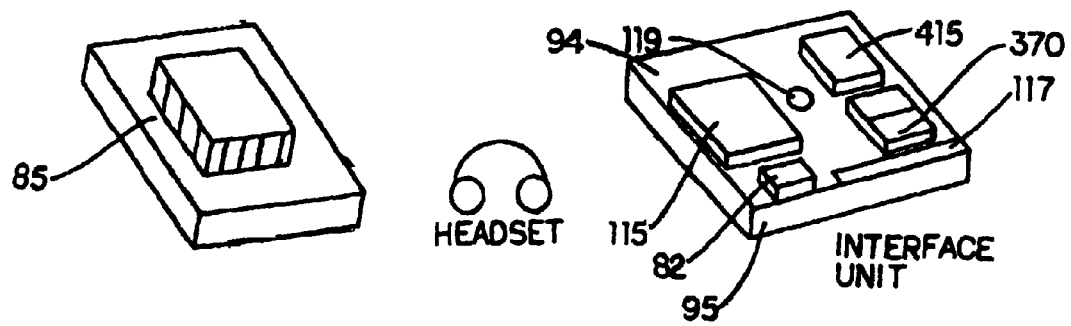

Referring to FIG. 2 is seen an exemplary embodiments of the communication apparatus comprising a cell phone (400) in wireless communication with the media device 300. The media device (300) comprises a body (3001) being supported by at least a mounting bracket (155) and secured by at least a fastener (5). The media device further comprises a radio device (410), input/output terminals (02), 911 emergency button (30), at least a 411 information button (49), various mode buttons (90), a push button for (005), Internet button (00) and at least a control device (40). The media device further comprises a player (435), a sensor (327), a phone slot (25) being configured with the sensor (327). The cell phone is being operable on a circuit board (94) comprising a microprocessor (85), an interface unit (95), at least one of chip (119, 115, 117, and 370). At least a detector (82) being operable with at least said one chip. A headset is operatively configured for communication with the cell phone (400) and/or the media device (300).

Figure 3:
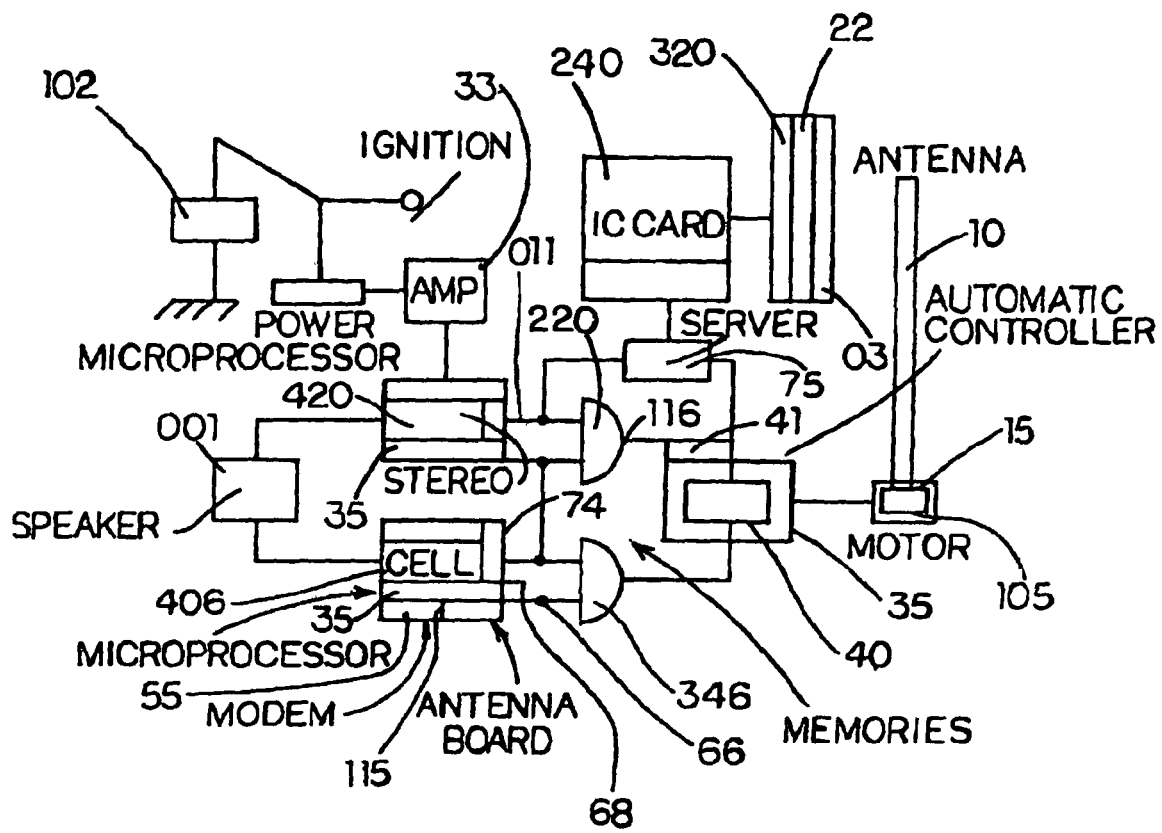
FIG. 3. is an exemplary embodiment of elements of the cell phone device circuit board being configured for the sequence of events which may occur during the operation of the communication apparatus.

Referring to FIG. 3 is seen an exemplary embodiments of a circuit board comprising memories (220), input/output terminal (03) remove-able/exchangeable IC card (240), a control device (40), a chip (115) communicatively connected to a logic circuit (346), and in communication with the antenna apparatus 10. The antenna apparatus comprises antenna board in proximity With a cell (406). The antenna apparatus is communicatively connected to the chip 115 operable with the logic circuit communicatively connected to a software program (116). The communication apparatus is in communication with the chip (115) being operable for signal amplification. Embodiments further provide stereo device configured with a mixer (35) and signal booster 33 in communication with a microprocessor (420). The microprocessor is further configured with a reset voltage switch responsive to incoming and out going signal communications. At least a speaker device (001) is operable with the communication apparatus. The stereo device is further configured with a radio modem (55) being operable with a hook-up control device (41) in communication with the communication apparatus. The hook-up control device is operatively connected to a dialer (68) configured with a dialer (74) and operable with the I/O terminal (03). Some embodiments provide a read only memory "ROM" (320) in communication with the IC card and/or the signal oscillator (22). At least a line terminal (011) is provided operable with the server (75). Certain embodiments provide the antenna apparatus (10) being connected to an automatic signal controller being disposed with at least a motor comprising at least a mirror case (15) operable with a reflective circuit (105). At least an encoder is communicatively connected to the antenna board.

Figure 4:
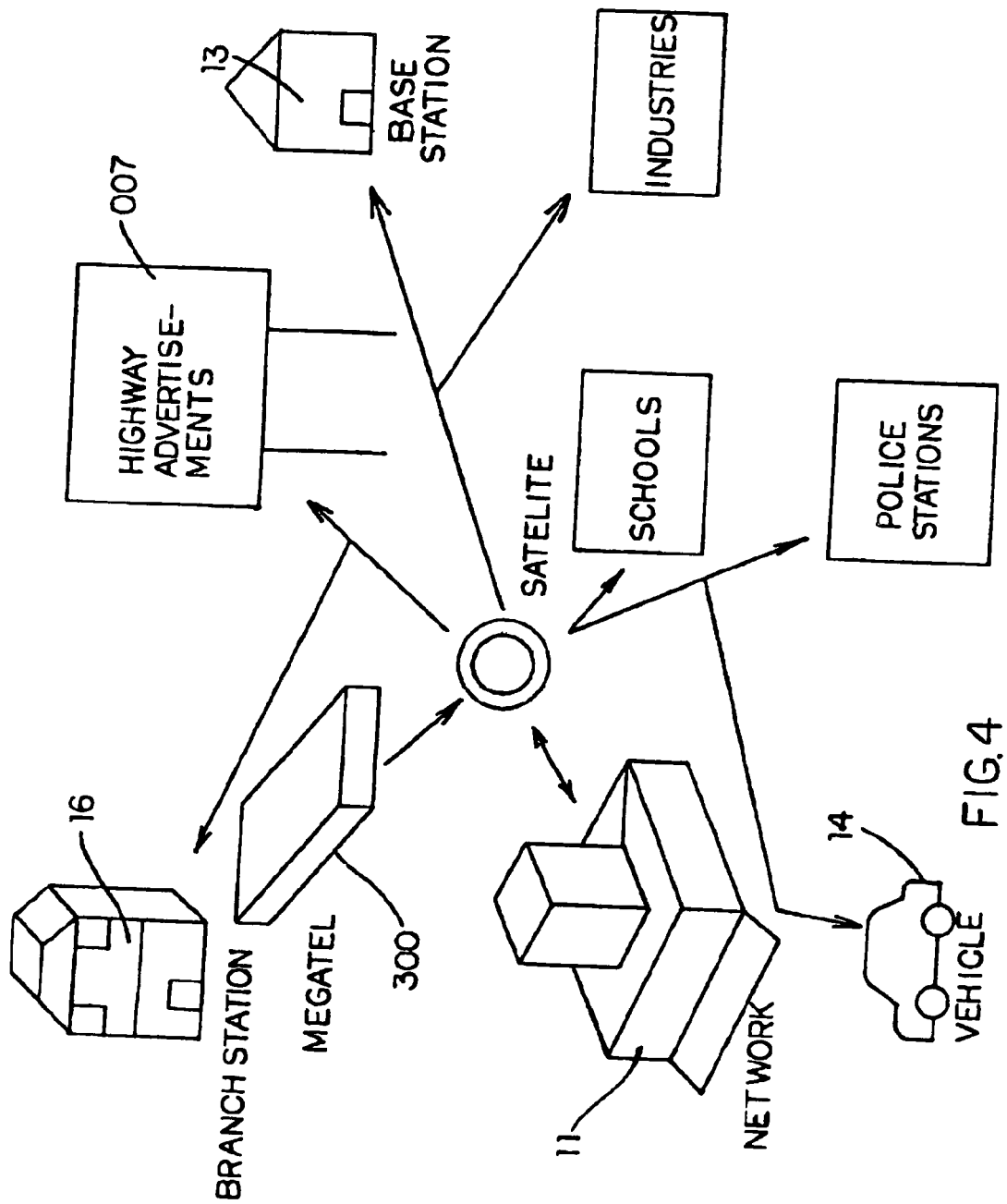
FIG. 4. is an exemplary embodiment of the device configured to communicate with various network interface.

Referring to FIG. 4 is seen an exemplary embodiments of the communication apparatus (300) in communication with at least one of a branch station (16), a highway sign (007), a base station (13), a satellite station, a school, a police station, a vehicle (14), and/or a network (11).

Figure 5:
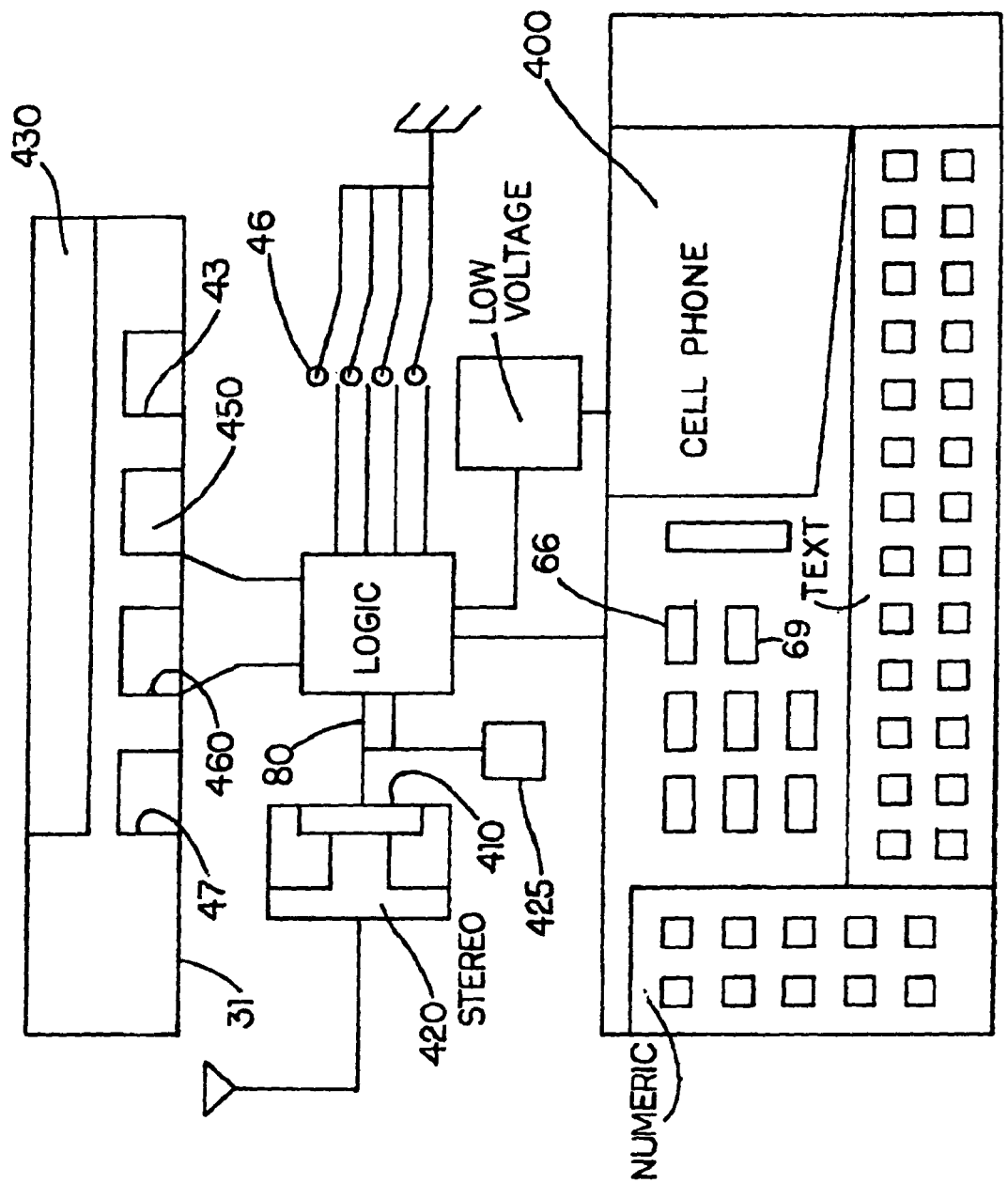
FIG. 5. is an exemplary embodiment of a circuit diagram of the logic interface configured for operation with the megatel, the cell phone and different components of the device.

Referring to FIG. 5 is seen an exemplary embodiments of the communication apparatus comprising a cell phone 400 being configured with a numerical pad, a text pad, a dialer (69), and an encoder (66). The communication apparatus further comprises a logic circuit in communication with at least one of electronic switches (46), CPU (425), radio device (410), low voltage indicator, and/or a stereo device (420). The logic circuit is further connected to at least one of: a wireless Internet means (430), signal transmitting source (31), an encoder (47), at least an electro-optical-modulator (460), a demodulator (450), diodes (80) and/or a decoder (43).

Figure 6:
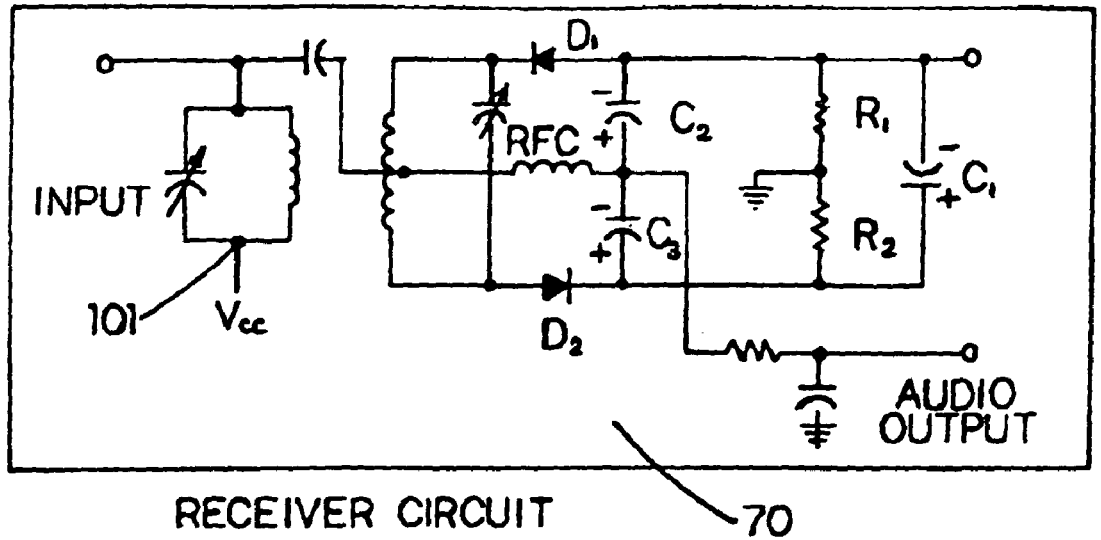
FIG. 6. is an exemplary embodiment seen to represent the circuit diagram of the receiver.

Referring to FIG. 6 is seen an exemplary embodiments of the circuit diagram for the receiver (70) being operable on low voltage (101). The receiver is operable for receiving communication signals.

Figure 7:
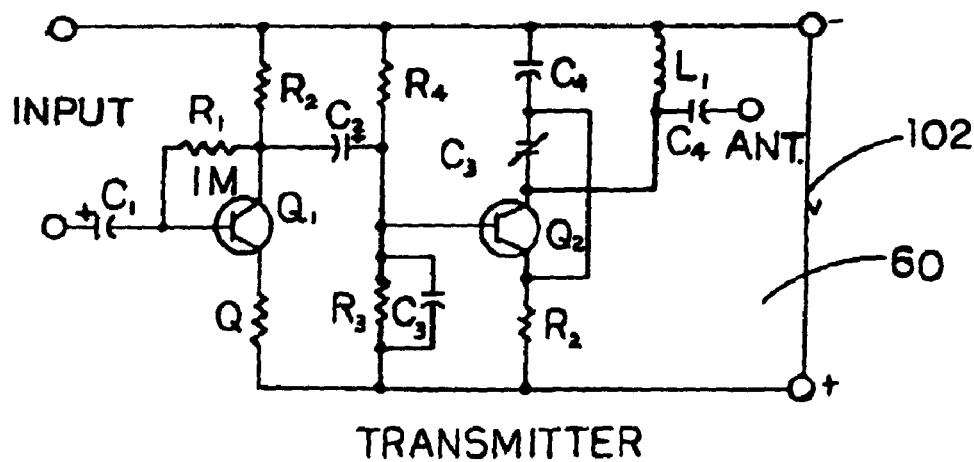
FIG. 7. is an exemplary embodiment seen to represent the circuit diagram of the transmitter

Referring to FIG. 7 is seen an exemplary embodiments of the circuit diagram for the transmitter (60) being operatively configured with a preset voltage (102). The transmitter is operable for transmitting communication signals.

Figure 8:
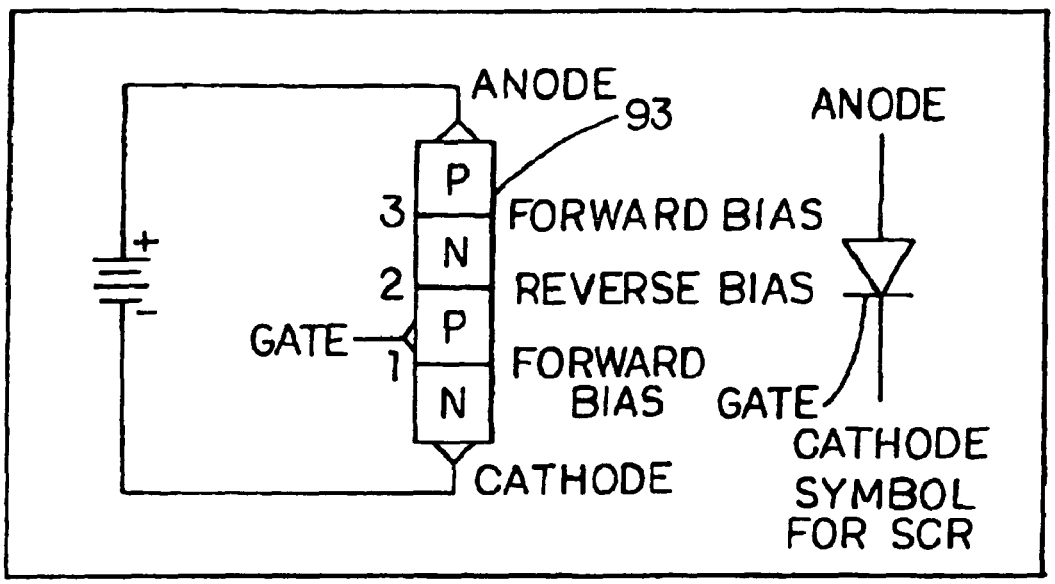
FIG. 8 is an exemplary embodiment seen to represent the block diagram of the control device switching circuit

Referring to FIG. 8 is seen an exemplary embodiments of the communication control device comprising silicon controlled rectifier consisting of a p-type and n-type gates. The communication control device is further operable in forward and/or reverse bias mode (93). The silicon control rectifier further is operatively configured for signal amplification and/or communication signal booster.

Figure 9:
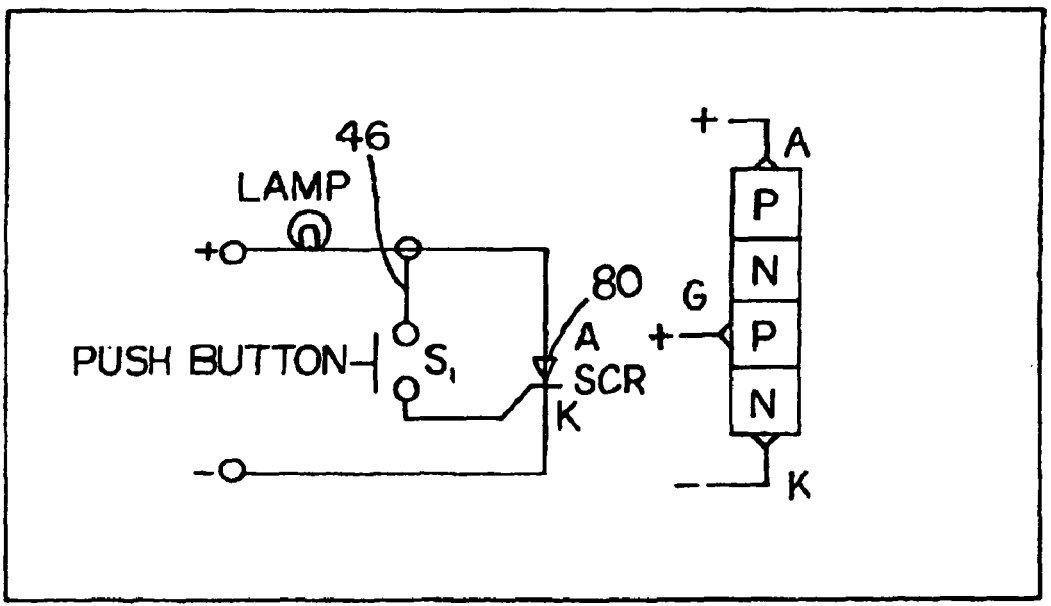
FIG. 9 is seen to represent a silicon control rectifier simple switching circuit for the control device.

Referring to FIG. 9 is seen an exemplary embodiments of the communication control device comprising silicon control rectifier being operable on a p-type and n-type gates. The silicon control rectifier is operatively configured with transistorized switches (46) in communication with a diode (80).

The communication control device being further configured for interactive communications.

Figure 10:
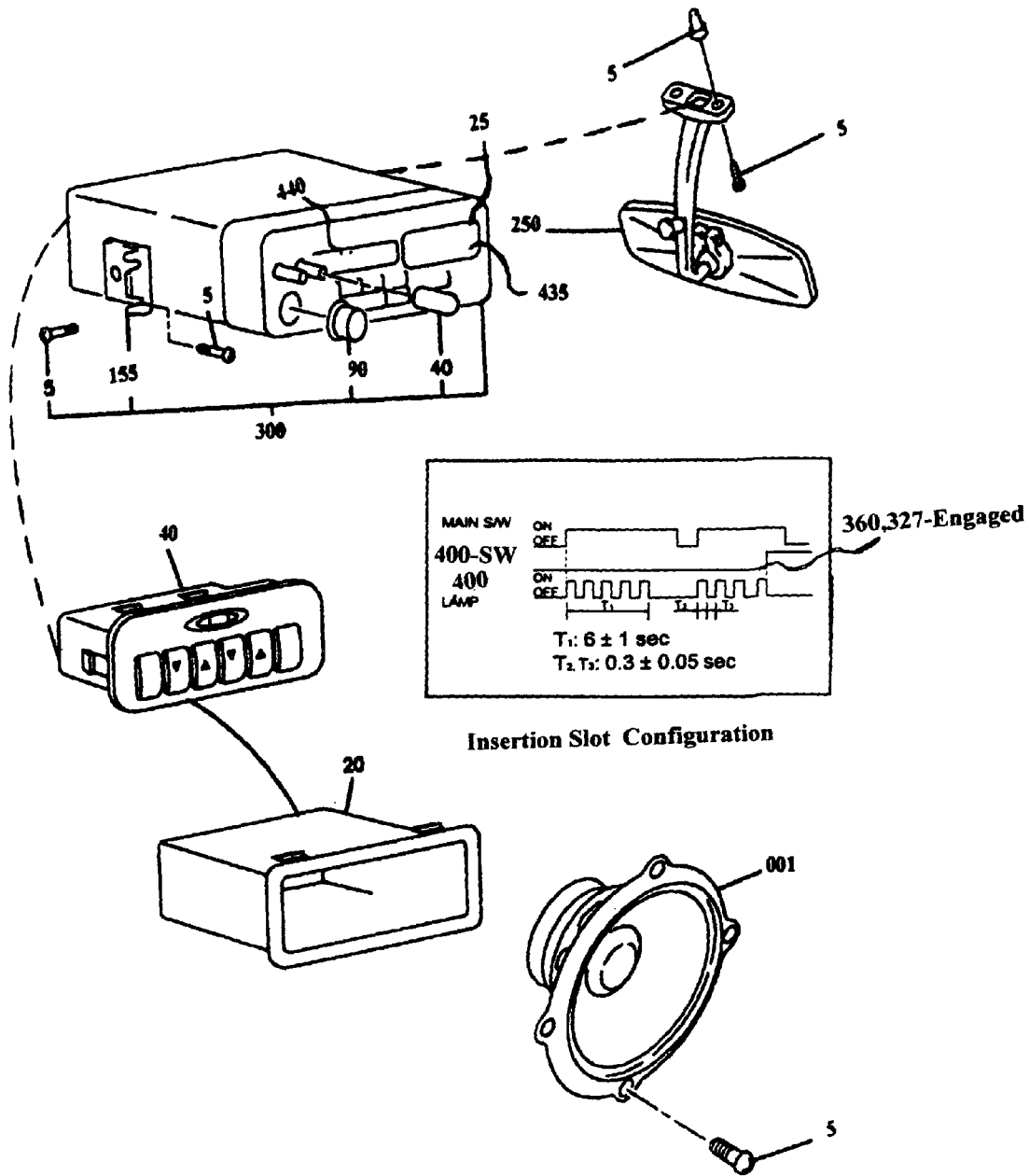
FIG. 10 is an exemplary embodiment of a diagrammatic view of the entertainment device configured with a control device and a display.

Referring to FIG. 10 is seen an exemplary embodiments of the communication apparatus (300) being operable with a media device (440, 435), in communication with the communication control device (40). Embodiments provide the communication control device being secured on a housing (20) by at least a fastener (5). The communication apparatus further comprise the cell phone (400) operatively configured with sensors (360) in further communications with sensors (327) being disposed in side the media device. The media device is secured on at least a mounting bracket (90) by at least a fastener (5). The media device being further configured with at least a slot (25) communicatively connected to a sensor (327) in wireless communication with the cell phone (400). Certain embodiments provide the communication apparatus in communication with an enlarged monitor screen (250). Embodiments provide the communication apparatus operatively configured for communications through at least a speaker device (001).

Figure 11:
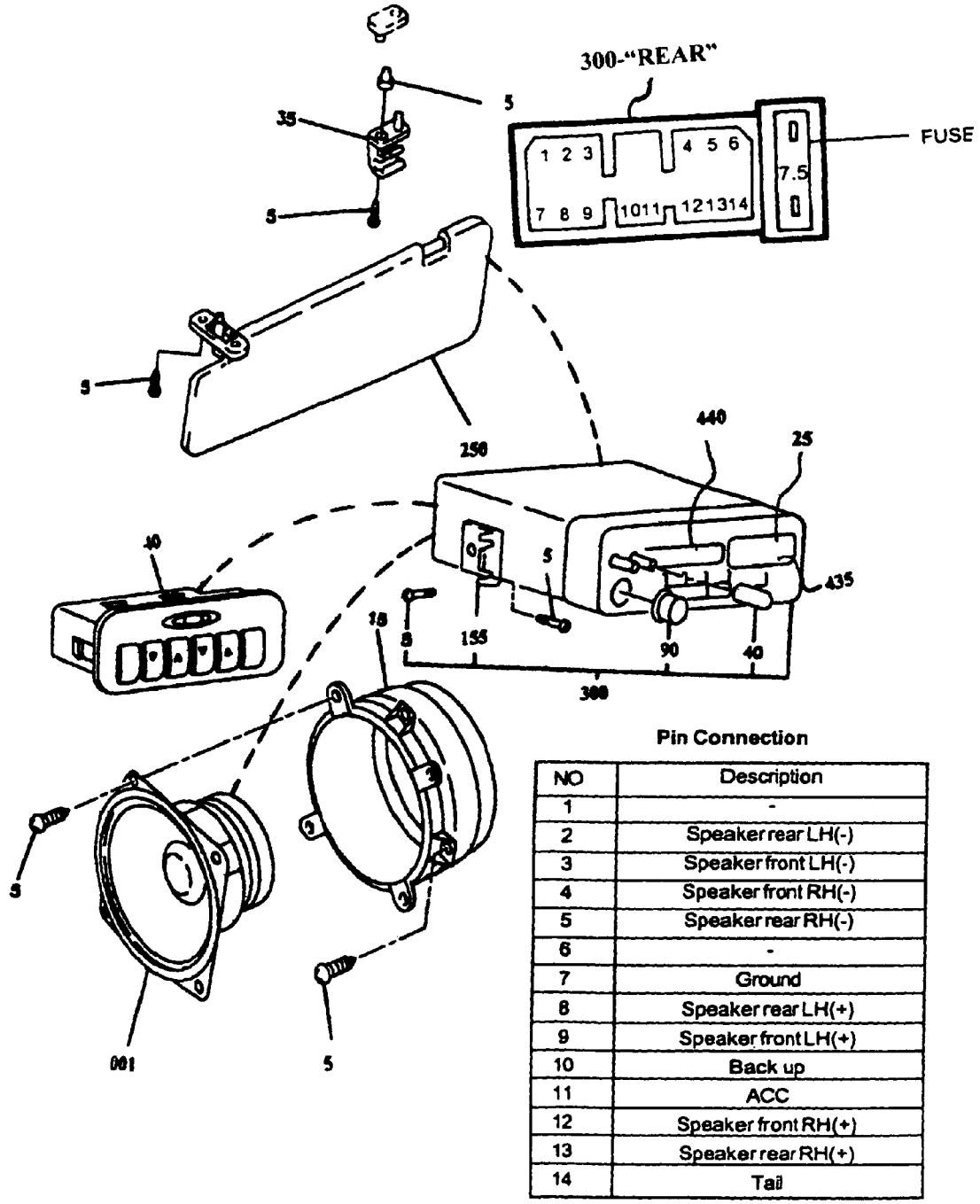
FIG. 11 is an exemplary embodiment of a diagrammatic view of the device configured with a speaker means, a control device, and a sun-visor monitor screen.

Referring to FIG. 11 is seen an exemplary embodiments of the communication apparatus (300) being operable with a media device (440, 435), in communication with the communication control device (40). Embodiments provide the communication control device being secured on a housing (20) by at least a fastener (5). The communication apparatus further comprise the cell phone (400) operatively configured with sensors (360) in further communications with sensors (327) being disposed in side the media device. The media device is secured on at least a mounting bracket (90) by at least a fastener (5). The media device being further configured with at least a slot (25) communicatively connected to a sensor (327) in wireless communication with the cell phone (400). Certain embodiments provide the communication apparatus in communication with an enlarged monitor screen (250). Embodiments provide the communication apparatus operatively configured for communications through at least a speaker device (001). The speaker device is secured in the housing by at least a fastener. Disclosed embodiments provide a protective fuse being operable to protect the device from transient pikes. In other embodiments, the monitor screen comprises at least one of: a mirror device, a visor device, each being firmly secured by at least a bracket (35).

Figure 12:
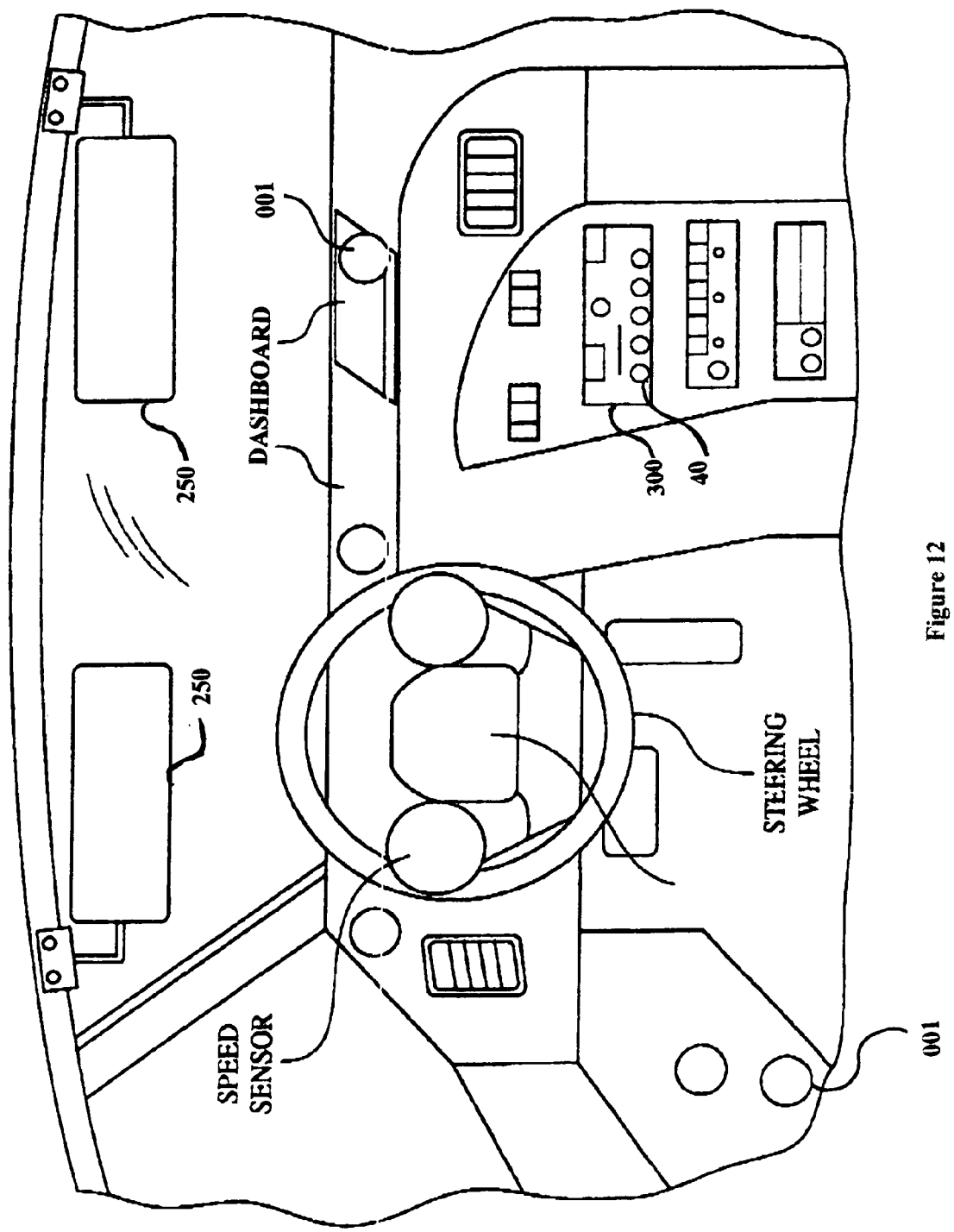
FIG. 12 is an exemplary embodiment seen to reflect sections of the interior part of a vehicle showing the dashboard, the megatel device configured with the control device, the speaker means and the sun-visor monitor screen.

Referring to FIG. 12 is seen an exemplary embodiments of the vehicle operatively configured with a dashboard, a steering wheel, and at least a speed sensor. The communication apparatus (300) is being safely secured on the dashboard. The Communication apparatus is operatively configured with the control device. The control device is further operable through the monitor screen (250). The monitor screen is operatively configured for interactive communications. At least a speed sensor is provided for monitoring when the vehicle is in motion and protect against any hands-on communications. The speaker (001) is communicatively connected to the communication apparatus and in communications with the monitor screen for providing audio/visual human voice auditory.

Figure 13:
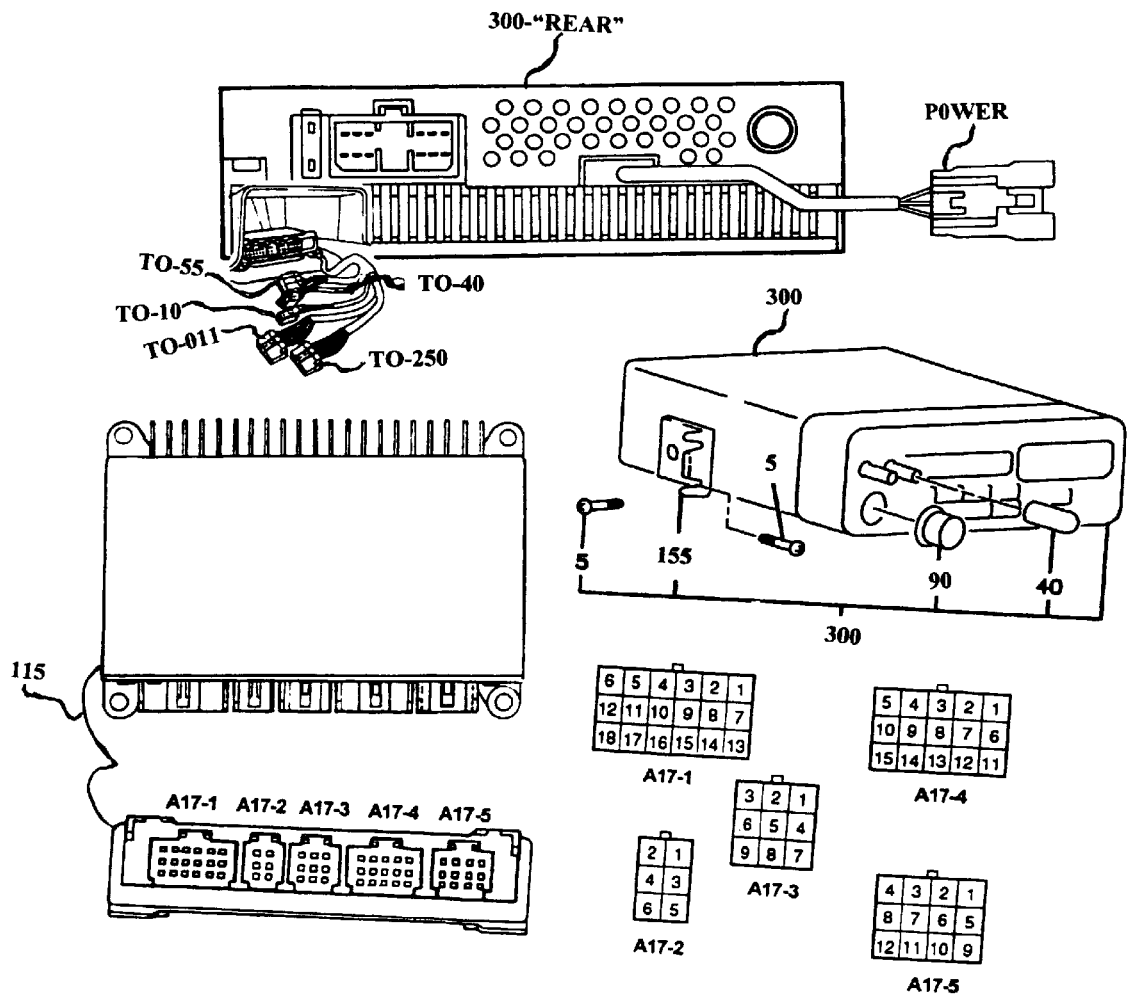
FIG. 13 is an exemplary embodiment of a chip operable with an antenna apparatus. The chip is communicatively connected to a communication apparatus.

Referring to FIG. 13 is seen further exemplary embodiments of the communication apparatus (300) which is being secured on a mounting bracket (155) by at least a fastener (5). The rear of the communication apparatus is provided with communication line to at least one of: line terminals (011), antenna apparatus (10), monitor screen (250), control device (40), a radio modem (55). The control device is further configured with various mode buttons (90). Embodiments provide a communication apparatus (300), operatively configured with at least one chip (115), operable with antenna apparatus (10), operable with the communication apparatus (300). Certain embodiments provide plurality chips, A17-1, A17-2, A17-3, A17-4, and A17-5. Each said chip is operative configured for specific functions. At least one function comprises communication signal amplification. At least one function comprises logical operations. At least one function comprises signal analysis. At least one function comprises network connectivity. At least one function comprises voice enable applications comprising converting text data to human voice auditory. At least one function comprises voice enabled applications comprising converting human voice auditory into text data. At least one function comprises media communications. At least one function comprises. At least one function comprises entertainment applications. At least one function comprises wireless communications. At least one function comprises interactive communications, at least one function comprises graphic interface. At least one function comprises GPS communications. At least one function comprises traffic media.

Figure 14:
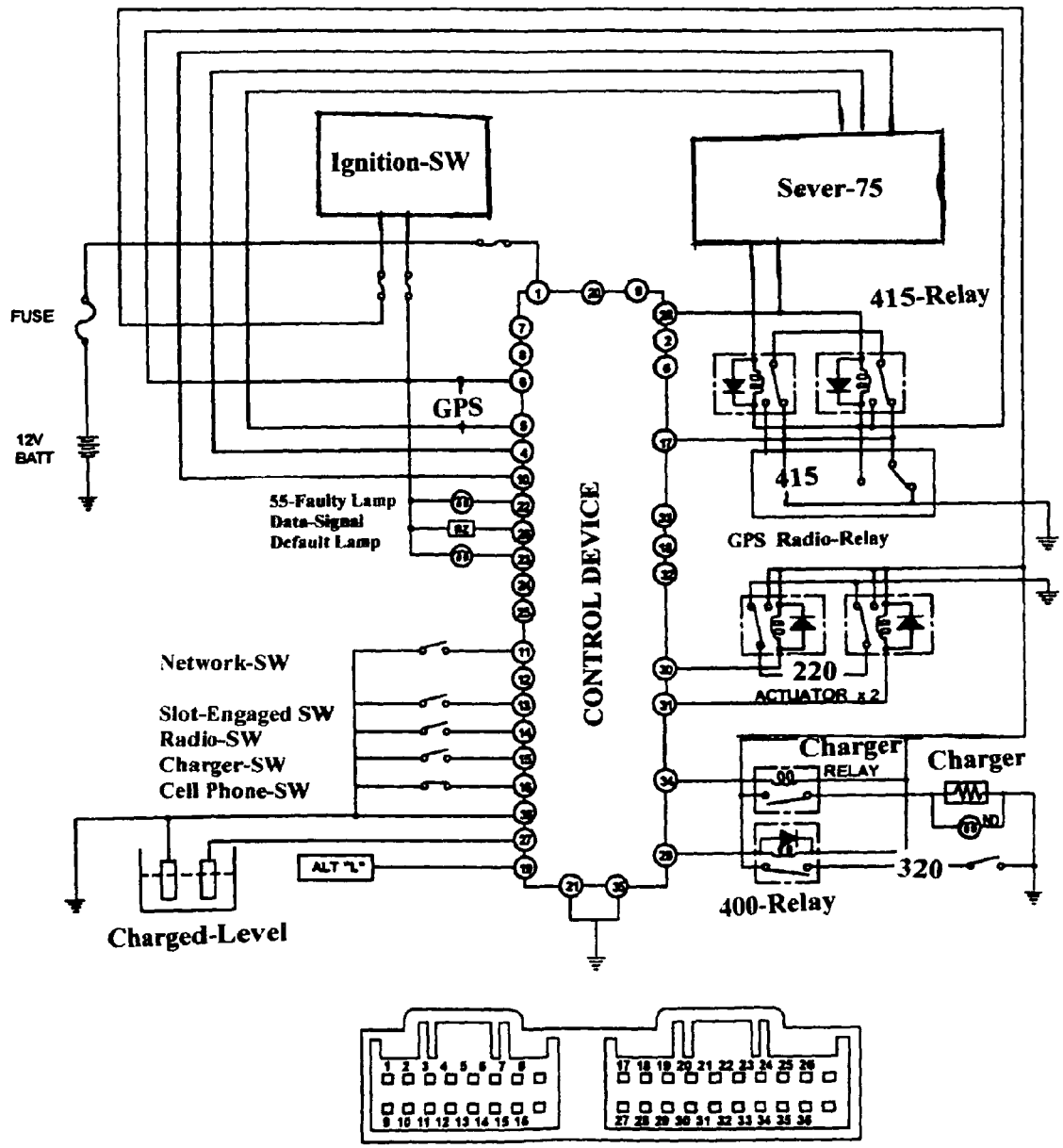
FIG. 14 is an exemplary embodiment of a circuit diagram comprising a platform array for the communication control device being communicatively connected to the communication apparatus being configured with a chip being operable for signal amplification.

Referring to FIG. 14 is seen an exemplary embodiments of the communication apparatus operatively configured with the communication control apparatus. The communication apparatus further comprises at least one of: a cell phone device, a server device, a GPS device, a radio device, a charging device. The communication apparatus operatively configured with transistorized switches in communication with at least a relay device. Embodiments further provide at least one of: fault indicator, date signal, charged indicator, at least memory, at least an actuator, at least a chip, and at least a wireless communication device.

Referring to FIGS. 1 and 3 is seen a display unit comprising a monitoring screen (250), being communicatively connected to I/O terminals (01). The IC card (240) comprises a second memory (320), in communication with the I/O terminal (03). Commands are processed in the main body (301) configured with the I/O terminal (01). The modem (55) is communicatively connected to the communication control device (40), which is operable when power is applied to the megatel device (300). The megatel device is secured on the dashboard by at least a support bracket (155) and fastened by a fastener (5). The control device (40) is operatively configured to access and process all the commands and in communication with memory (220) being configured with the monitoring screen (250). The control device (40) comprises at least a silicon control rectifier "SCR" operatively configured for accessing and processing all commands in the command state as input. Embodiments provide the modem (55) communicatively connected to the software program (116) operable with the megatel device (300), in communication with the monitoring screen (250) and/or other external display devices.

The software program (116) is programmable and configured for communications with other elements of the megatel device (300), including the cell phone slot (25), the cell phones (400), radio (410), the stereo (420), and the wireless Internet (430) means. The software is communicatively connected to the logic circuit shown in FIG. 5, being further operable to process input and output data and in communication with memory (220) being operable with the monitoring screen (250). The software further comprises an operating system configured with at least the control device (40), in communication with the wireless radio fiber optic modem chip (115) being communicatively connected to the modem (55). The modem is operable in the on-line state to enable at least data transmission over the airwave to be treated as receiving data or calls. The wireless radio fiber optic modem chip (115) is configured with the IC card (240) being further operable to permit exchange of input and output of data between devices. Disclosed embodiments provide interactive wireless communication and information system operable for content distribution and allowing vehicular communication with much tolerance to safety. Disclosed embodiments further advances safe driving with improved communication clarity between the drivers of the vehicles and the communication means on the highways, such that traffic communication is being provided through the interactive means of the communication apparatus. The cell phone (400) is wirelessly connected to the megatel device (300), and may further be connected through the inset slot (25) being operable for hands-free cell phone (400) usage when the vehicle is in motion, and for a vehicle-to-vehicle communication through the IC card (240). By insetting the cell phone (400) in the inset slot (25) provides input and output communications through the megatel being operable with the IC card (240) through direct connections. The IC card memory or ROM (320) is where all programs for operational data processing are stored to allow the RAM (340) to access stored data through the line terminals (011). Processed data are stored in the ROM (320), including languages and software (116) being further operable to invoke the RAM (340) responsive to functional operations, including operational data responsive to wireless communication and information retrieval.

Referring to FIGS. 3 and 4 is seen communication apparatus being operable with the software program (116) and transferring communication data through the line terminal (011) to at least one of: the megatel device (300) and/or the IC card (240). The software programs and functional data are at least stored in the ROM (320) and the IC card (240) to allow interactive wireless electronic communication by exchanging information in the IC cards (240) that are uniquely operable within the communication medium. There is a second I/O terminal (02) at the megatel body (301) that allows data to be shared with other devices. The cell phone (400) uniquely employs an input device from a personal computer (11), a base station (13), and a branch station (16). When a call is transmitted, the radio (410) enables communication with the base station (13) through the radio waves, allowing the receiver (70) to absorb the emitted signal from the base station (13) to the branch station (16). The transmitted signals are digitalized. When a call is transmitted from the base station (13), the antenna (10) absorbs or receives the signal. The signal is being communicated to the mixer (35) for filtration. The oscillator (22) is operable with the mixer (35) and in communication with the amplifier (33). The amplified signals are demodulated into digital signals by the demodulator (450).

The demodulated signals are then sent to the CPU (425) for operational processing. The CPU (425) process selection calls to allow other communication means like road constructions, exit rams, advertisements, police communication such as police chases through the branch stations (16) to the megatel device (300). The branch stations transmission medium permits calls made within localized range with the receiver (70) to be classified as a local calls. Thereby limiting accumulation of cell phone bills and improving on road communication. In the case of vehicle to vehicle communication, when a call is made from a vehicle to another, or when the tag number (14) is dialed, that information is transmitted into characters and numeric strings, a digital 1/0 to the base station digital communication system. The tag number is inputted as data input. The input data is then subjected to the operational processes of the CPU (425). With the fast growing concern about school safety, dialing the programmed school bus number or the programmed tag number of the school bus allows access to communication between the school bus driver and parents. This will prevent and permit parents to always check the safety or the where about of their children. In a preferred embodiment, communications are further provided through a personal computer or a television connected to a set-top box. Embodiments provide a "TV system being viewed on a sun-visor and/or a screen monitor displayed on a sun-visor". The content to be displayed may be transmitted as an analog/digital signal, or as a digital signal being modulated onto an analog carrier. The signals are received over a wireless links, or via an amplified antenna apparatus or satellite dish. Though television sets are designed to receive analog signals on computer display devices. These devices are being designed to display content/pictures being encoded in a digital format. Embodiments provide a decoder system operable for converting analog signal into digital data for display on a television set and/or a monitor.

Embodiments provide a microprocessor (85) being configured for identifying numbers, letters, and emit radiant energies traveling through waves. Certain embodiments provide at least one chip comprising at least a microprocessor operatively configured to demodulates the absorbed energy and modulates the emitted energy. The chip (115) is communicatively connected to the logic circuit and being operable with the antenna apparatus (10). Disclosed embodiment provide chip in communication with the communication apparatus. The carrier detector (82) detects an open station. When the open station is detected, the oscillating frequency from the branch station would be enabled so that the carrier of the frequency is being controlled at the station. The oscillator (22) is communicatively connected to the Electro-optical modulator (460) through electronic switches (46), being operable with the transmitter (60) responsive to the transmission mode. When the transmitter (60) is on the transmission mode, the modulator (460) is operable corresponding to the dialed tag number (14) or the input information that is to be transmitted from the CPU (425), thereby allowing at least the carrier to responsive to the modulation signal. Embodiments provide further the amplifier (33) being operable for amplifying the modulated signal and for transmitting the signal to the base station (13) through the antenna apparatus (10). The base station (13) receives the transmitted data from the branch station (16) and allows communication between parties. The branch station (16) also receives information from the base station (13). One of the stations could be at least a satellite station and said software operatively configured with the communication apparatus for communication with a network station.

Referring to FIGS. 3 and 5 is seen further embodiments of the communication apparatus being operable for transmitting and for receiving communication signals through the antenna (10), being operable with the antenna switch (15) responsive to the received signals, which are being amplified by the high frequency amplifier (33) in communication with the mixer (35) for signal filtration. The demodulated data is communicable to the CPU (425) for operational processing, and the operational processed data is stored in memory (220). In one embodiment, the fiber optic modem chip (115) is embedded inside the wireless radio modem (55) in communications with the Internet button (00) being operable for at least one of: Internet transmission, radio waves transmissions, wireless Internet communications, land based mobile communications, air based mobile communications, and air and marine vehicles communication applications. Embodiments further provide wireless vehicular Internet communication apparatus being operatively configured for at least one of: vehicular communications, information system, vehicular Internet activities and electronic wireless communication without any interference with the steering wheel control. The wireless vehicular Internet communication means includes methods for selecting and inserting advertisements in an information document which may be displayed to at least a user. The method selection is based on at least a television programming and/or processed media to be communicated to vehicular occupants. The communication means and methods further includes using the Internet or another information retrieval system that includes a client based system and/or a remote server to provide vehicular information, entertainment, communication, and advertisement. The client based system monitors television programming viewed by at least a user and compiles the user profile characterizing in-vehicle media or vehicular television programming.

Embodiments further provide method to eliminate automotive safety hazards through hands free communications. Embodiments provide apparatus through which a number is dialed to a recipient telephone number. If the recipient was driving at the time of the call, communication is enabled to allow hands free communication between the sender and the recipient through radio wave lines and the stereo speakers of the vehicles. Disclosed embodiments further provide a method for pushing on the Internet button (00) operable for Internet connection, activation, and communication. When the Internet button (00) is pushed, the monitor screen (250) automatically active and allows viewing of all Internet activities. That is, the server (75) communicatively configured with the control device (40), the decoder (43), the encoder (47) and the wireless modem chip (415) operable for Internet communication.

The server (75) further comprises a workstation, in-vehicle computer, a computer device, or other network node being operable for providing the management of at least multiple vehicles and networking resources a single point of administration. The server includes a wireless transceiver device that allows transferring files and other data to other wireless electronic equipment by way of antenna means. The server (75) provides (a) server functions via wireless local area network (LAN). The LAN may be a bus, hub, or any other network type and may contain a firewall configured for communications with the media device. A firewall is a hardware device or software that allows only authorized computers on one side of the firewall to connect to a network or computer on the other side of the firewall. Firewalls are known and commercially available devices or software which could be implemented.

The server (75) is operable on a media device being operatively configured with communications software that includes network operating system (NOS) software such as windows NT, Unix, Linux, or Novell Netware. The server (75) may include a login server application for initial configuration such as Novell Directory Services ("NDS"), which is a product for managing access to computer networks. Embodiments further provide methods for a network administrator to set up and control a database of users and manage them using a directory with a graphical user interface. Using NDS, or the server (75), users of the media devices and in-vehicle computers and other communication devices at remote locations can be added, updated, and managed centrally. The initial login operation to the network is typically controlled by a script, which is executed or interpreted. Other means of operation in addition to Novell Directory Services may include Microsoft's Active Directory to be utilized as a directory service. Moreover, any suitable and compatible software and/or hardware may be utilized in the instant device to assist in controlling access to and management of the network resources.

The server (75) may also comprise of file server, e-mail server, and Internet server applications to enable separation of data storage. The file server application allows files contained on the server (75) to be accessed by at least wireless devices. The email server may be utilized to manage and control email accounts on the wireless network and permit the sending and receiving of Internet email via Internet. The email server utilizes voice enabled applications to read mails to recipients. The Internet server allows access to the Internet and operable with at least a browser in communication with the World Wide Web to search contents specific to users needs and for file transfers using the File Transfer Protocol. The Internet server is further configured for allowing the transmission and receipt of Internet electronic mail messages, including audio/visual messages and/or human voice auditory from suitable network nodes such as the mobile terminals of various networks.

In addition to the server applications being described herein, the server (75) includes management and control applications for managing and controlling each of the devices connected to the server (75), including at least one of: a media device, the appliance, and the environmental device. For example, the server (75) is operatively configured with a software for automatically controlling a thermostat in a vehicle or for providing a uniform means of controlling each of the electronic devices on the wireless LAN 150.

The office equipment of the LAN 150 is signified by the dashed circle in FIG. 1 and provides all of the functions of conventional equipment that may be associated with a home or workplace office. For example, printers may be implemented as an impact or non-impact printing device for printing text and images on a printing medium. Similarly, scanner and fax machine may provide conventional optical scanning and facsimile transmission functions respectfully. Despite these conventional functions, the printers, the scanner, and the fax machine are provided with a wireless transceiver suitable for communicating with the server (75) via respective antennas. In this regard, special server applications such as a print server may be provided on the server (75) to allow all terminals on the network to share the printers, and office equipment in general.

Referring to FIG. 3 is further seen the control device (40) being configured for signal detections in communications with the ring indicator (74) and the Internet server (75). The tone encoder (66), the dialer (68), and the ring indicator (74) are operatively configured inputting and for outputting communication signals without any interference with the driving operation of the vehicle. The ring indicator (74) identifies calls and also allows the metal base sensors (360) of the cell phone (400) to decode calls permissible over the radio means and the antenna means. Accordingly, the control device (40) is operatively configured for the cell phones (400) communications and further operable with the hook-up control device (41) to connect all phone calls to the server (75). After the calls are connected, they are then transferred and decoded from digital to analog, allowing dial tones or rings to be heard through the stereo speakers (001). When a call is made, the control device (40) receives the phone number from the tone encoder (66) and decodes the number to identify the destination country so that an appropriate receiver is enabled. The server (75) is configured with the control device (40) being responsive to the receiver (70) and/or to the Internet networking.

Referring to FIGS. 6 and 7 are seen the receiver (70) and the transmitter (60) being operable to transmit and to receive voice and data communication signals through wireless means. The server includes a memory communicatively connected to departments of motor vehicle files. The server is further responsive to communications to department of transportation. The ROM (320) stores all the tag numbers (14) for each state, and when the tag number is dialed, the decoder (43) compares the coded tag number to that of the ROM (320). If the matching signal is identical, the ROM (320) then send the tag data to the CPU (425) that will then process data and enable communications with the base station (13). The reflected signal or radiated signal is absorbed by the antenna (10) and received by the CPU (425). The CPU (425) controls the logic that allows wireless communications, data processing, and component interface. The computer program comprises programmed code being embedded in the computer storage medium in communications with the computer means. Embodiments provide methods of communication through the frequency of the department of motor vehicle administration. The tag number (14) comprises a predetermined phone number or emergency number associated with the regular phone number to enable an identification number or a private number code for the purpose of completing the required dialing number requirements.

The dialing codes identify the state in which the recipient is based. The memory of the server (75) includes data that are shared among traffickers when an emergency is eminent, providing easy means of communication in the highway. The stored data are used as identification numbers, which are assigned to individual vehicles and modified for use as regular phone numbers. Plurality of the tag numbers could be dialed during police chase or road emergency, by simply assigning a code to the direction of the route in question. The cell phone switch (002) allows the server (75) to allocate data that are coded and assigned as emergency numbers and phone numbers. That is, when the tag number (14) is dialed, the server (75) will look up the number in the data storage or memory (320) to determine the vehicle with which the tag number (14) is assigned to. The number with the identification code is then forwarded to the switch (002) for connecting the recipient connectivity.

Embodiment further provide an entertainment device being configured with software being programmable for operation with the computing system. A computing system further comprises communication channels that allow communication with other systems and devices. The communication channels are examples of communications media which embodies computer-readable instructions, data structures, program modules, and/or other data in a modulated data signal such as a carrier wave or other transport mechanism, including any information-delivery media. By way of example, and not by limitation, communications media include wireless/wired media, such as wireless/wired networks and direct-wired connections. The wireless media comprises acoustic, radio, infrared, and other wireless media. The computing system comprises input components, including VOIP, keyboard, mouse, pen, a voice-input component, a touch-input device. Output components include screen displays, speakers, printer, at least a module such as adapters for driving them. The computing system is also powered by a power supply, including cells and battery devices.

The fiber optic modem chip (115) and the microprocessor (85) are further operable to transmit and receive signals and also programmed to dial a 911 or a home phone number when a collision is detected. The communication apparatus further relates to a special Internet applications and interactive screen (250) being interfaced for viewing and monitoring Internet accessed information and for providing output data. When a radio means is activated, the radio (410), CD player (440), and cassette player (435) are enabled. Embodiments further provide the cell phone device in communication with the transmitter (60) being operable to impact communication signals. The cell phone device is further operable through the radio speakers (001) operatively connected to a media device. The emitting cell phone signal carries a low voltage (101) to empower the cell phone coded information, where the coded information enables the megatel device (300) to operate intelligently by providing exchange of information advancing communications and driving safety. The low voltage (101) line signal is the source voltage of the cell phone (400), which is configured with a controlling means that monitors the voltage count to the preset voltage (102). The voltage counts output signals to the CPU (425) being further operable to control strings of events in communications with the built in logic and the network.

Embodiments provide low power consumption communication apparatus being operatively configured for processed data transmission through the wireless radio modem (55), to the server (75). Certain embodiments provide at least a receiver antenna (10) being responsive to communication signals. The communication signals are outputted through the radio transmitter (60) through the antenna (10). All signals are reflected to the reflection circuit (105), in response to the processed data signals in communication with the demodulator (450) being operable to demodulate the received data or signals travelling through the receiving antenna (10) to the communication apparatus. Data are transmitted from IC card (240) to the megatel device (300) through radio transmission to enable vehicle to vehicle communication to further improve driving safeties. The transmitted messages are coded by the source (31) and decoded by the receiver (70) to initiate vehicular communications. The entertainment device comprises at least a computer means configured to enable turning on and off different switches depending on the amplification requirement. Specifically, when the switches are turned on the keyboard is activated and rendered operable. The insertion slot configured with the IC card (240). The insertion slot is further configured with an indicator composed of a light-emitting diode. Loading the IC card into the insertion slot will illuminate the light-emitting diode (LED). The LED blinks when the IC card (240) is loaded.

The control device (40) upon receiving data from the IC card (240) communicates the data to the fiber optic modem chip (115) configured with the radio modem (55) so that demodulated carrier signal is radiated to the antenna (10). Signals are transmitted through electrical impulses that are changed into sound waves and used to transfer, emit, and absorb the coded information. The impulses are changed to sound waves to enable the megatel device logic mode to be operable with the accept button (47) to further advance the hands free communication to reduce accidents caused by the use of cell phones (400) while driving. When the send button (48) is utilized, electrical impulses are enabled to emit radiant energy through the antenna (10). The radiant energy transmits communication data for wireless communication and information without any interference with the steering wheel (004). Accordingly, the coded signal includes, but not limited to dialing a tag number (14) and a family code to complete a regular dialing system that allows a ten digit or eleven digit number dialing.

Embodiments further provide a 411 button (49) in communication with the microprocessor (85) operable with the directional software (116) for communicating with the data base for the department of transportation and for providing network services between transportation highways, the police, and computers. The embedded chip (117), the fiber optic modem chips (115) and the Electro-optic modulator (460) provide translation of electrical signals to optical signals to enhance the wireless Internet services in vehicles. The embedded chip (117), the RAM (340), and the CMOS (370) are in operation with the microprocessor (85), the fiber optic modem chips (115), and the Electro-optic modulator (460) being operable to intelligently transmit and receive wireless Internet communication and other wireless cell phone (400) communications. The self-test chip (119) is configured with the self-test button (44) operatively configured to check the functionality of the components of the megatel device (300) and/or the communication apparatus each time the device is in operation. Embodiments are operable with the transmitter (GO) to transmit to various destinations while the receiver (70) receives transmitted data and display all data through the sun-visor monitor screen (250) or the interactive display device for the communication apparatus. The monitoring screen (250) is built in the sun-visor (130), with electronic wires running through the sun-visor base (131) to the megatel device output terminal being operable to allow data to be displayed through the screen (250).

Referring to FIG. 1 and FIG. 10, when the tag number (14) is dialed, the microprocessor (85) will power the megatel device (300) to pick the radio or microwave signals in other to ascertain megatel communication. The megatel device (300) further allows cell phones (400) to be electrically charged by means of the contacts made between the coded metal base sensor (360) of the cell phone (400) and the second sensor (327) inside the megatel slot (25). The cell phone (400) is further connected to the megatel device cell phone slot (25) to allow the metal base sensor (360) of the cell phone (400) and the second sensor (327) of the megatel (25) to initiate contacts so that communication through the stereo (420) and the speakers (001) are ascertained. The megatel device (300) is operable as hands free cell phone (400), when the cell phone (400) is inserted in the slot (25). When the cell phone (400) is in the slot (25), the metal base sensor (360) of the cell phone (400), and the second sensor (327) of the megatel device (300) communicatively connected to ascertain communication through the stereo system (420) and provide audible output responses through the speakers (001) and/or the display device. The speaker is disposed on at least components interior of the vehicle or the cell phone and secured by at a least fastener. The control device (40) is disposed/snapped onto a housing (20) and connected to the entertainment device by at least a cable means. The control device (40) is configured with a spring-like clip (35) that snaps securely into the housing (20). The megatel device comprises a vehicular entertainment system comprising at least a portable electronic apparatus configured with methods for receiving information from a transmitter and providing the information to at least a vehicular occupant as disclosed. The megatel device (300) is further configured with at least a sun-visor display for providing visual information to the vehicular occupant, and the visual information includes an image and at least one active area. At least one touch button is associated with the active area for enabling input data, data retrieval, and data transmission. At least a modem is responsive to data received/transmitted. At least a memory stores the plurality of data into a hierarchy level sequence of memory frames. Each memory frame is uniquely identifiable and includes information portions corresponding to images, active areas and links. A control device identifies which information is to be displayed upon a query.

The microprocessor (85), the fiber optic modem chips (115) are the intelligence of the megatel device comprising a programmable means for contacting the corps through a one push button (005) being operable for communication between the corps and vehicles on the direction of the corps patrol. Together with the emergency 911 button (30), the megatel device (300) facilitates connections to the nearest police station or police car for immediate emergency rescue. In other to allow other networks and businesses to advertise nationwide along the highway, pluralities of microprocessor (85) are programmed to enable communication between the advertising board (007) on the highway and the megatel device (300). Near by restaurants and other businesses along the perimeters of the highway, the gas stations and other lucrative areas could be programmed to advertise and communicate with the megatel device (300) to inform commuters about the advertised businesses or products. The microprocessor (85) further enables the power antenna (10) to absorb or emit coded energies to initiate communication.

The fiber optics used for the construction of the antenna (10) and components of the megatel device (300), including the transmitter (60), and the receiver (70), transmits and receives wave signals from radio waves and microwaves by determining the amount of light traveling down the fiber. The fiber optics measures the amount of light traveling down the fiber or from one fiber to another in optical radiation. The optical properties change each time the fiber optic is exposed to other electrical data sources. That is, the speed of the light remains constant when the voltage is removed from the modulator (460), and varies when the voltage is installed in the modulator (460), allowing the light wave to reinforce each other and create a 1 "bright". When the waves are out of phase, they cancel out each other, creating a 0 "dark." The modulation is laser-like modulated with the computerized electrical signals or impulses. The lights are switched from dark to bright, which represents OFF and ON, or 0's and 1's in digital information and communications. The fiber optic modem chip (115) allows Internet activities to be enabled. The built-in amplifier (33) further amplifies the microphone (306), which is embedded in the sun-visor (130), and the communication apparatus of the cell phone (400). The sun-visor is adjustable to accommodate different drivers. The interface unit (95) is communicatively connected to the circuit board (94) being operable to allow the system's control functions and memories to intelligently control functions of the microprocessors (85) in communication with the network software (116).

Referring to FIG. 3, certain embodiments provide the fiber optic modem chip (115) being activated when the manual or automatic switch (200) for the wireless Internet is enabled, allowing corresponding pin interface to be in communication with other fiber optic modems (55) and server (75). Transmission to the modem (55) is synchronous, permitting the transmission time to be selected for internal and external or loop-back clock. This communication is then converted internally to synchronize the format in compliance with other standards for Internet usage. Disclosed embodiments provide transmitted data to be received through the antenna (10). The antenna (10) receives radio waves transmission and transfers the transmitted signal to the megatel device (300). The megatel device (300) then receives and demodulates the signal to ascertain an output. Carrier signal is modulated in response to the transmitted data by diode (80), so as to reflect radiated signals to the radio modem (415), through the antenna (10). The diode (80) detects the received signals and supply's the control device (40) with the detected communication signal in communication with the amplifier (33) being operable for signal amplification through the stereo means to the speakers (001). In other embodiment, the speaker is disposed in a housing (015) and held in place by at least a fastener (5). Still in other embodiment, the sun-visor is secured on a bracket (035) disposed on the roof and secured by a fastener (5). The control device (40), upon receiving the signal, enables communication with the CPU (425) being operable to supply processing data to the carrier and also to receive transmitted data from the demodulator (450). The CPU processed data are then supplied to the RAM (340) for modulation in response to the CPU transmitted data. The modulated signal is then sent to the bias (93) being configured with at least a decoder (43) that decodes the received signals and output it to the stereo speaker (001). Various mode (90) and buttons allow stored messages or emails to be received and transmitted to the monitoring screen (250). The monitoring screen (250), which may include a liquid crystal display means that is built and housed inside the sun-visor (130), is being configured for viewing of all wireless Internet related activities in vehicles and cell phones (400), further comprising displaying all transmitted data through a view window (131).

Disclosed embodiment provide power and other input to the monitoring screen (250) through line connections into the pivotal hollow mounting base (05) of the sun-visor (130) into the power circuit for the screen (250). The megatel device (300) operates on low voltage, which is about the electric source for the cell phone (400). When the cell phone signal is communicated externally, the source voltage will refer to a preset voltage (102) configured to logically allow signals to be received and further permit communication through the megatel device (300). Embodiments further provide the cell phone (400) being operable in wireless connection with the media device. Certain embodiments provide the cell phone being inserted into the slot (25), and providing communication/being operable through a media device. Other embodiments provide Internet communication being enabled through the server (75) being operable to receive the Internet transmitted information or data viewing and communication output through monitoring screen (250). Certain embodiments provide the monitoring screen is being communicatively configured to display all the transmitted Internet data or information when activated, to further allow viewing of related data. The monitoring screen (250) is positioned at the interior of the sun-visor (130) and mounted atop the vehicle interior. Some descriptive embodiments for the monitoring screen (250) include the screen for the communication apparatus.

Referring to FIG. 1, the sun-visor (130) is pivoted at a supporting base (05) to absorb vibration and is connected to a ball joint (06) to further allow permissible screen angle adjustment and relocation. The sun-visor mounting base (05) and the monitoring screen (250) are pivotally moveable, and comprises of a cover (015), that covers the monitoring screen (250) when disabled. Embodiments provide the communication control apparatus being further operable to electronically enable the screen when Internet transmission is eminent. The mirror case (15) is an accessory for individual use. Embodiments further provide the communication apparatus being configured with semiconductor devices being operable for higher scale of signal integration and functional intelligence, providing improved cellular communications and vehicular wireless Internet services, communications and the like. When the megatel device (300) is enabled and the Internet button turn-on, related data are activated and output is enabled into the monitor screen (250). Such data are stored and transferred/transportable to other PCs for later use. The logical circuitry is further configured for determining the sequences in which numeric assignments of numbers are differentiated from text character assignments and to be distinguished from the number counts. Numeric counts start from 0 to 9 while the character counts starts from 10 to 35. The arrangement of the count is not absolute, as it could further be arranged in different applications and settings.

| NUNERIC TO DIGITAL DAILING SYSTEM "DECIMAL TO BINARY" | | | | | | | |
|---|---|---|---|---|---|---|---|
| DECIMAL | 0 | 1 | 2 | 3 | 4 | 5 | 6 | 7 |
| BINARY | 0 | 1 | 10 | 11 | 100 | 101 | 110 | 111 |

| DECIMAL | TEXT CHARACTER | BINARY |
|---|---|---|
| 10 | A | 1010 |
| 11 | B | 1011 |
| 12 | C | 1100 |
| 13 | D | 1101 |
| 14 | E | 1110 |
| 15 | F | 1111 |
| 16 | G | 10000 |
| 17 | H | 10001 |
| 18 | I | 10010 |
| 19 | J | 10011 |
| 20 | K | 10100 |
| 21 | L | 10101 |
| 22 | M | 10110 |
| 23 | N | 10111 |
| 24 | O | 11000 |
| 25 | P | 11001 |
| 26 | Q | 11010 |
| 27 | R | 11011 |
| 28 | S | 11100 |
| 29 | T | 11101 |
| 30 | U | 11110 |
| 31 | V | 11111 |
| 32 | W | 100000 |
| 33 | X | 100001 |
| 34 | Y | 100010 |
| 35 | Z | 100011 |

When the numeric and text character dialing system is used for assigning cell phone (400) numbers for the megatel device (300), the numbers will be digitized and coded to turn on series of switches representing 0s and 1s in digital counting. The 0s and 1s are the number of bright light and dark, a representation of the change of optical properties when exposed to electrical data source. Numeric numbers and text characters are converted to binaries and coded to speed up the counting processes.

The invention is fully described by means of the specific embodiment but not limited to the following claims.

What is claimed is:

1. A communication apparatus; comprising: at least a media device communicatively connected to at least a sensor, said media device outputly configured for communications;
   a communication apparatus communicatively configured for at least a telecommunication application and/or at least an Internet application:
   said communications apparatus being operable with at least one antenna apparatus communicatively configured with at least a chip, said antenna apparatus operable to perform at least one of: transmitting signal communications, receiving signal communications;
   said chip being operable with the antenna apparatus in communications with said communication apparatus, said communication apparatus being responsive to at least a full access wireless communications connection being operatively provided via at least a remote communication control apparatus, at least a communication control apparatus operatively configured for at least a wireless device application: and
   said communication apparatus further comprising at least a computer device comprising at least one of: at least a processor, and at least one memory device, said communication control apparatus comprising an input/output device, said input/output device further comprising at least a graphic user interface.

2. The communication apparatus of claim 1, wherein said communication apparatus further comprising at least a mobile communication device, said mobile communication device further comprises at least an audio device communicatively connected to at least said one computer device.

3. The communication apparatus of claim 2, wherein said audio device further comprising at least a media device responsive to at least a normally read-only data, and said computer device operatively configured with at least an operating software being communicatively connected to one of: said memory device, at least a logic circuit being configured with at least said software in communication with said chip, wherein said audio device further configured for channeling communication signals internal to said media device without any external physical connection.

4. The communication apparatus of claim 2, wherein said audio device further comprising at least one speaker and/or at least one microphone each communicatively configured with said communication apparatus, said communications apparatus further comprising a cell phone communicatively connected to said computer device, said cell phone in communication with at least a sensor disposed in said communication apparatus, said communication apparatus being communicatively connected to said audio device, said audio device further configured with at least an audio/visual device operable for inputting and/or outputting communications, wherein said one audio/visual device further comprising at least one of: a touch screen input/output device, at least a speaker device, and at least a microphone device, said speaker device and said microphone device communicatively configured for voice enabled communications, including Voice Over Internet Protocol "VOIP".

5. The communication apparatus of claim 1, wherein said communications apparatus further comprising at least a video communication apparatus comprising at least a SIM card processor communicatively connected to said communication control apparatus operable to selectively and/or simultaneously transmitting and receiving analog and digital signals of varying frequencies.

6. The communication apparatus of claim 1, wherein said communication apparatus further comprising at least a cell phone device being operatively configured for communications and communicatively configured for entertainment, wherein the cell phone device being operable on a platform comprising one or both of: said audio device and/or said computer device, further comprising at least a downloadable means.

7. The communication apparatus of claim 1, wherein said communication control apparatus further providing wireless interconnectivity of said computer device to at least a worldwide computer network, and wherein said computer device operable for wireless communication with at least said worldwide computer network, said worldwide computer network further comprising at least a local internet service provider portal to said network and/or at least a satellite network.

8. The communication apparatus of Claim 1, wherein said communications apparatus further comprising at least one transmitter and at least one receiver each configured with at least one antenna apparatus, wherein said chip being operatively configured to separate signals normal to at least one of: said audio device, cell phone device, and at least an electronic data transmission device, and wherein said electronic data transmission further include signals normal to Internet transmission and/or signals responsive to wireless interconnectivity of said computer device to said networks.

9. The communication apparatus of claim 1, wherein said antenna apparatus operable to perform at least one of: transmitting signal communications to at least mobile communication network, receiving signal communications from at least a mobile communication network further comprising the step of sending information fur identifying the wireless LAN that the wireless device is requesting to be added to, and sending information for identifying the type of wireless device requesting to be added to the wireless LAN.

10. The communication apparatus of claim 1, wherein said communication apparatus further configured with at least said media device comprising at least one of: a CD player and/or a CD-ROM driver, and wherein said media device communicatively connected to at least said chip, said chip further comprising at least an information retrieval system being interactively configured for communications, said computer device further comprising at least a server computer and/or a client computer each responsive to television programming normally viewed by at least a user of said information retrieval system.

11. The communication apparatus of claim 10, wherein said communication apparatus further comprising means for separating signal communications, said CD-ROM driver being further configured for loading at least a data content into said computer device, further comprising at least a receiving step comprising receiving a network protocol software operable on the wireless device being identified and further compatible with the LAN being identified.

12. The communication apparatus of claim 1, wherein said wireless device applications further comprising at least a wireless device operatively configured with at least a transistorized switching devices operable for signal amplification, wherein said signal amplification further includes communication and information signals clarity and said CD-ROM driver further comprising at least one memory device, said transmitting step further comprising sending information requesting optional network services for the wireless device application and said receiving step further comprising receiving network information necessary to obtain the optional network services of the wireless LAN for communications.

13. The communication apparatus of claim 1, wherein said communication control apparatus further comprising voice enabled media device being operatively configured for broadcasting at least an incoming and/or an outgoing communications, wherein said one broadcasting further comprising human voice auditory, and at least said one communications further comprising electronic mailing, wherein at least a communication functionality is being disabled responsive to cell phone and/or email functionality.

14. The communication apparatus of claim 1, wherein said communication control apparatus further operable with said chip with at least (a) the logic circuit, said logic circuit operatively configured with said communication apparatus, said media device communicatively interfaced with at least a data processing device, and said media device further comprising at least an audio/visual device comprising at least one of: a radio device, at least said communication control device comprising a display device, said display device further comprising at least a communication control apparatus, said display device operable with at least an interactive screen for communications and further configured with at least one of: a pointer apparatus, a cursor apparatus, a voice activation and/or voice enabled action apparatus, further comprising at least a location for the pointer apparatus and the cursor apparatus being positioned for at least an action being directly invoked over the area of the display device.

15. The communication apparatus of claim 14, wherein said radio device further utilizing the network information to the wireless device to establish a full access wireless connection to an access point of the wireless LAN.

16. The communication apparatus of claim 15, wherein said wireless LAN further comprises at least a transmission medium, including at least one of: a radio wave, at least a microwave, at least an ultrasonic wave, and said communication apparatus further comprising said radio device being operable in at least said media device, said media device further comprising a car stereo system being configured for communications, said communications further comprising the acts of compiling a profile of at least a user of the information retrieval system, whereby the profile further comprising information corresponding to at least the wireless LAN and/or at least a television programming each consisting of utilizing at least a network.

17. The communication apparatus of claim 16, wherein said network further comprising at least one of: a GPS receiver, at least a GPS transmitter, said network in communications with at least said antenna apparatus for receiving satellite signals from a plurality of GPS satellites memory each comprising at least data representation of a desired destination, and wherein the media device further comprising at least an entertainment device being operatively configured with a processor operable with the GPS receiver, said memory operatively configured for calculating a location and media device being communicatively configured for navigation as a function responsive to at least the calculated route via said GPS satellite memory, wherein said radio device further configured with at least a speaker coupled to said processor for providing audio/visual communication to enable ease of navigating along the route to the desired destination.

18. The communication apparatus of claim 15, wherein said communication apparatus communicatively connected to at least a bypass means configured with said computer device, said computer means device communicatively connected to said communication control apparatus, said communication control apparatus further responsive to signals from at least one of: said radio device and/or said cell phone device, and said media device each configured for communication operations, said communication apparatus further includes an input/output device coupled to at least said processor being configured for sending/receiving data contents and/or for entering/selecting the desired destination of at least a vehicle.

19. The communication apparatus of claim 15, wherein said full access wireless connection further comprising applying a default profile to media device, the media device further comprising at least one set-top box apparatus operatively configured for communications with at least a satellite and/or at least a wireless local area network (LAN) and/or responsive to a supplemental profile; further comprising applying the default profile to at least a device associated with at least the supplemental profile.

20. The communication apparatus of claim 1, wherein said communication apparatus further comprising at least one of: a transmitting apparatus, a receiving apparatus each configured with at least a chip responsive to signal strength for wireless communications, said wireless communications further include communicating to at least one of: at least a communication device for plurality of vehicles, a communication device for at least a corporation, a communication device for at least a store, a communication device for at least a restaurant, a communication device for at least an agency, a communication device for at least a network configured for transmitting and receiving processed/queried data, and at least a remote communication device, wherein one said communication further includes at least one of: marketing advertisement, searching the Internet for content, obtaining data via at least a Department of Motor Vehicles server, Internet communications, wireless communications, email communications, and media communications.

21. The communication apparatus of claim 1, wherein said communication apparatus further comprises at least a GPS receiver/transmitter being configured for communications, said communication apparatus further communicatively connected to at least a highway sign comprising at least a construction information boards being disposed with at least a communication apparatus, further comprising a time determination device being configured for communicating with said information board the current road events and time, said communication apparatus further configured for prioritizing at least a priority value to a received signal in accordance with the determined real time occurrence of at least an event and providing at least one of: audio communications, visual communications for said event.

22. The communication apparatus of claim 21, wherein said GPS receiver/transmitter further comprising a logic circuit being configured for coding/decoding communication signals, wherein said communication apparatus responsive to a regular tag number dialing system for at least one of: vehicular communications, wireless communications, and video conferencing.

23. The communication apparatus of claim 1, wherein said communication apparatus operatively connected to at least a chip configured with the logic circuit, said logic circuit being configured for operation relating to signal strength, at least the logic circuit operable with a software comprising at least an operating system, further comprising at least a demodulation unit being operable to demodulate received data using information processing comprising at least a designated frequency, said demodulation unit further comprising at least an MPEG transport stream being communicatively connected to at least a retrieving device being operable to retrieve from the MPEG transport stream a file system operable to execute at least an application, said file system further comprising at least a controllable direction being operable to receive a record request and to control recording according to the received record request.

24. The communication apparatus of claim 23, wherein said communication apparatus in communication with said software further comprising at least a Bluetooth technology configured with said computer device being operatively responsive to communications, further comprising a computer usable medium configured with at least a computer readable program code embodied therein for influencing functions of a program to enable controlling at least an information processing system, said computer readable program code further comprising means for influencing said computer device to effect the functions of at least a device.

25. The communication apparatus of claim 24, wherein said software further comprising at least an operating system configured with at least a word processor program and/or an internet browser each communicatively configured with said computer device, said computer device further configured with at least the computer readable program code for activating functions of an information processing system and for performing transactions, and wherein said processor being configured to receive at least a data package comprising receiving network protocol software operable on the communication apparatus identified and compatible with the LAN identified.

26. The communication apparatus of claim 25, wherein said software program further comprising at least a browser being operatively configured with said computer device, said communication apparatus communicatively connected to at least an antenna apparatus responsive to incoming and outgoing wireless signals to and/or from at least a network, the computer device further comprising a display responsive to audio visual communications, further including an image transport stream and/or at least one image active area, comprising at least a one touch screen for communication.

27. The communication apparatus of claim 1, wherein said communication apparatus communicatively connected to communication control apparatus, said communication control apparatus further comprising a sun-visor comprising a monitor screen configured with at least an electronic screen protector, said monitor screen comprises at least a graphic user interface responsive to plurality of applications and/or to interactive communications.

28. The communication apparatus of claim 1, wherein said communication apparatus further comprising a wireless communication device, further comprising at least a method for using the communication control apparatus to setup at least a wireless electronic device to join a wireless local area network (LAN).

29. The communication apparatus of claim 1, wherein said communication apparatus further configured with at least a communication method, said communication methods further comprising sending a setup request from at least the media device being configured for operation with in-vehicle communication control apparatus for joining at least a limited access connection via at least a wireless area network (LAN).

30. The communication apparatus of claim 1, further comprising at least a setup request comprising a request being compiled for the wireless LAN for receiving data package from the communication apparatus, wherein the data package further includes network information necessary for the wireless device to join the wireless LAN, and wherein said communication apparatus utilizing the network information at the wireless device to establish a full access wireless connection to join at least an access point of the wireless LAN.

31. The communication apparatus of claim 1, wherein said communication apparatus further comprising at least a device for determining a current navigation means routes, comprising: receiving from a user of the navigation device an input corresponding to a desired destination: calculating a route from the current location of the navigation device to the desired destination: and providing audio/visual communication to the user through at least a speaker device to navigate the user from the current location to the desired destination.

32. The communication apparatus of claim 1, wherein the media device further operable for navigation, and wherein the current location of the navigation is being determined by at least one of: a GPS receiver, an antenna apparatus, and at least a processor being operatively configured for communications with at least a network.

33. The communication apparatus of claim 1, wherein said computer device further comprising at least a frequency synthesizer operable for differentiating signal communications, wherein the full access wireless communications further comprising connections to at least a network comprising at least one of: a cable network, a satellite network, a local area network, and/or an Internet Protocol Television network.

34. The communication apparatus of claim 1, wherein said communication control apparatus communicatively connected to at least an entertainment device being configured for communications: the media device further comprising a slot communicatively connected to at least a sensor being configured with mobile communications device applications, said mobile communication device application comprising computer-readable instructions being executable to cause said computer device to configure to at least a network interface card responsive to packets at a frequency to at least one destination device, the network interface card being communicatively configured with a host, at least one destination device residing beyond a plurality of intervening network devices, wherein said frequency being sufficiently determined by an antenna apparatus communicatively configured with at least a chip being operable to prevent communication signals from expiring inbound network mapping to the host on the intervening network devices: further comprising configuring the network interface card responsive to packets until the network interface card receives a further action signal to prevent roaming signals.

35. The communication apparatus of claim 1, wherein said communication apparatus communicatively connected to at least a sensor being configured for mobile communications, said chip is operable with the antenna apparatus in communication with the communication apparatus, the chip being configured to amplify signal communications received via the antenna apparatus.

36. A communication apparatus; comprising: at least a media device communicatively connected to at least a sensor, said media device outputly configured for communications:
　a communications apparatus configured with at least one of: a transmitter, at least one receiver:
　said transmitter and said receiver communicatively connected to at least one of: an antenna apparatus being operable to perform at least one of the following: transmitting signal communication to a wireless communication network, and receiving signal communication from a wireless communication network, at least a chip operatively connected to the antenna apparatus, the chip being configured for operation with the communication apparatus for amplifying said signal communications:
　said communication apparatus communicatively configured for at least a telecommunication application and/or at least an Internet application: and
　at least a communication control apparatus comprising at least an input/output device, said input/output device comprising at least a graphic user interface being operatively configured with said communication apparatus, said communication apparatus further operable for separating communication signals normal to at least one of: an audio device, a cell phone device, and at least a computer device, at least said one signal further responsive to wireless interconnectivity to and/or from at least a communication network.
　at least a media device.

37. The communication apparatus of claim 36, wherein said communication apparatus comprising at least a SIM card processor being configured with at least a sensor means communicatively connected to said communication control apparatus being operatively configured with said computer device.

38. The communication apparatus of claim 36, wherein at least a software comprising at least a software program being operatively configured with at least a browser, said browser being operatively configured with at least a computer device, said computer device further being communicatively connected to at least a chip operable with said antenna apparatus in communication with said network.

39. The communication apparatus of claim 36, wherein said computer device further comprising at least a computer-readable media being configured with at least a computer-executable instructions for implementing a communication method for at least a sender computer device and/or at least a receiver computer device each responsive to at least data communications.

40. The communication apparatus of claim 36, wherein said communication apparatus further comprising at least one of: an act of the sender computer device receiving an instruction to place at least a call to the receiver computer device: an act of the sender computer device receiving at least a user-entered identification of a context for at least the telephone call: an act of the sender computer device constructing a call invitation data structure that includes an invitation to the receiver to engage in at least a call conversation via the user-entered identification of the context of the call: an act of the sender computer device transmitting the call invitation data structure wirelessly to the receiver computer device: an act of the receiver computer device receiving the call invitation data structure; an act of the receiver computer device reading the identification of the context of the call from the call invitation data structure; an act of permitting a user to define at least at the receiver computer device plurality of rules for causing the receiver computer device to automatically take at least an action in response to the identified context of the call from the call invitation data structure; and an act of the receiver computer device automatically taking at least one action from the plurality of actions depending on the context of the telephone call being based on at least one of the plurality of rules.

41. The communication apparatus of claim 40, wherein the computer device responsive to at least an action taken by the receiver computer device, further comprising sending at least a message to the sender computer device and rerouting/declining calls that satisfy/do not satisfy at least an identity and/or identity/rules criteria.

42. The communication apparatus of claim 36, wherein the communication control apparatus further operatively configured to request for information and to receive additional information from the sender/receiver to determine the action to be taken based on at least the additional information, and whereby the communication control apparatus providing a communication session between at least the communication apparatus and at least a voicemail system if an identity criteria have not been met.

43. The communication apparatus of claim 42, wherein the communication control apparatus further comprising a graphical user interface comprising at least a web interface comprising at least a call manager responsive to communication requests for the communication apparatus, and wherein said graphical user interface being disposed on at least a display device being operable for interactive communications.

44. The communication apparatus of claim 36, wherein the communication apparatus comprises at least one transmitter and at least one receiver each being configured with at least a chip being communicatively connected to at least a communication control apparatus, and wherein at least an event is being communicated, including at least one of: receiving a request recommending at least one television program, determining that a user has accessed a video-on-demand channel, determining that a user has accessed a pay-per-view preview channel, determining that a user has requested an electronic program guide and/or any combination thereof, and requesting that at least a user is being joined for at least a conference.

45. The communication apparatus of claim 36, wherein said radio device further comprising said audio device being configured with at least one speaker and at least one microphone, said radio device further comprising a network interface operatively configured to facilitate communications to and/or from at least one of: the local area network, a satellite network, a video head-end of a television service provider, and the communication apparatus.

46. The communication apparatus of claim 36, wherein said communication apparatus further comprising at least a cell phone device being configured with at least a sensor, said sensor in communication with at least a media device operatively configured for entertainment and communications, said media device further comprising at least a slot communicatively connected for recharging said cell phone device and for allowing wireless communications.

47. The communication apparatus of claim 36, wherein said communication apparatus further comprising a visor apparatus comprising at least a screen device being operatively configured with at least a software communicatively connected to at least said computer device, said computer device further comprising instructions executable by at least a processing logic circuit being communicatively connected to a digital video recorder (DVR) comprising at least a wireless a video communication processor in communications with said local area network/satellite, said video communication processor operatively configured for at least one of: recording, transmitting, and receiving, said receiving comprises receiving at least one television program being associated with at least a supplemental profile for at least a set-top box device, further comprising automatically instructing the DVR to record at least a television program associated with at least a default profile, wherein said default profile further includes at least the image of at least a caller and/or a receiver.

48. The communication apparatus of claim 36, wherein said screen device operatively configured with an input/output device being communicatively configured for at least one of: inputting communication data content, outputting communication data content, said screen device further comprising voice enabled media device being operatively configured for broadcasting at least incoming and/or outgoing communications.

49. The communication apparatus of claim 36, wherein said communication apparatus further comprising at least a detection device communicatively connected to a logic circuit being operatively configured with said software, said detection device further comprising at least one of: interactive screen being configured for inputting and/or for outputting data, device for monitoring wireless devices connections and/or multiple audio connections for a multimedia conference event, at least a device for determining at least one audio quality parameter for at least an audio connection if lower than a defined threshold value to form an audio quality warning state: and at least a device for generating an operator message with the audio quality warning state and one or more options to improve audio quality for the audio connection, wherein at least said improved audio quality further comprises at least one of: signal amplification for communication clarity, signal identification, and signal strength for preventing continuous communication breakaways.

50. The communication apparatus of claim 36, wherein said media device further comprising at least one of a CD player and/or CD-ROM driver, further comprising an audio management component being operatively configured to manage wireless communications and/or at least audio connections for a multimedia conference event, said audio management component further comprising at least an audio monitor module being operatively configured to monitor plurality audio connections responsive to wireless device proximity and/or multimedia conference event, at least one audio signal quality parameter being determined responsive to an audio connection being defined by at least a threshold, said threshold having at least a value forming said audio signal quality, at least an audio message module being communicatively connected to said audio monitor module, said audio message module generating at least a message responsive to the audio signal quality.

51. The communication apparatus of claim 36, wherein said communication apparatus further comprising multimedia conferencing server being operatively configured for managing communications: further comprising an audio/entertainment management component being operatively configured to manage multiple audio/entertainment connections for multiple communications and/or meeting events: said server further operable for separating signal communications and communicatively connected to said media device for loading content of at least a read-only data into at least a memory device: said memory device further comprising instructions being executable by processing at least (a) said logic circuit to receive electronic program guide (EPG) data from at least a video head-end to at least a display apparatus.

52. The communication apparatus of claim 36, wherein said CD-ROM driver comprises at least one memory device: said logic circuit being disposed in at least a digital communication terminal and being configured for implementing switched decoding and for outputting at least graphic images, further comprising at least a wireless video communication processor being configured for outputting and/or inputting at least a video program and/or an entertainment music stream.

* * * * *